(12) United States Patent
Owada et al.

(10) Patent No.: US 12,555,268 B2
(45) Date of Patent: Feb. 17, 2026

(54) OBJECT RECOGNITION DEVICE, OBJECT RECOGNITION METHOD, NON-TRANSITORY COMPUTER-READABLE MEDIUM, AND OBJECT RECOGNITION SYSTEM

(71) Applicant: NEC Corporation, Tokyo (JP)

(72) Inventors: Takahiro Owada, Tokyo (JP); Mineto Satoh, Tokyo (JP); Masatsugu Ogawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 302 days.

(21) Appl. No.: 18/268,523

(22) PCT Filed: Dec. 25, 2020

(86) PCT No.: PCT/JP2020/048760
§ 371 (c)(1),
(2) Date: Jun. 20, 2023

(87) PCT Pub. No.: WO2022/137509
PCT Pub. Date: Jun. 30, 2022

(65) Prior Publication Data
US 2024/0371033 A1 Nov. 7, 2024

(51) Int. Cl.
*G06T 7/73* (2017.01)
*G06V 10/25* (2022.01)

(52) U.S. Cl.
CPC ............. *G06T 7/75* (2017.01); *G06V 10/25* (2022.01); *G06T 2207/10028* (2013.01)

(58) Field of Classification Search
CPC ............ G06T 7/75; G06T 2207/10028; G06T 2207/10024; G06T 7/70; G06V 10/25; G06V 10/56; G06V 20/64
See application file for complete search history.

(56) References Cited

U.S. PATENT DOCUMENTS

2019/0087976 A1* 3/2019 Sugahara ................. G06T 7/73
2019/0392602 A1* 12/2019 Lloyd ....................... G06T 7/73
(Continued)

FOREIGN PATENT DOCUMENTS

JP         H0788791 A    *  4/1995
JP         2019-056966 A    4/2019
(Continued)

OTHER PUBLICATIONS

International Search Report for PCT Application No. PCT/JP2020/048760, mailed on Mar. 30, 2021.

*Primary Examiner* — Oneal R Mistry
*Assistant Examiner* — Jongbong Nah
(74) *Attorney, Agent, or Firm* — Sughrue Mion, PLLC

(57) ABSTRACT

An object recognition device being able to accurately specify a position and pose of a target object is provided. The object recognition device includes: a specification unit that specifies an object region including a three-dimensional point cloud indicating a position of a surface of a target object, based on a three-dimensional point cloud generated by converting a distance image including distance information to the target object, and specifies a reference shape similar to the target object, based on a three-dimensional point cloud included in the object region and feature information about a reference shape; and an estimation unit that estimates a reference position and a pose of the target object, based on a three-dimensional point cloud included in the object region and the specified reference shape.

14 Claims, 17 Drawing Sheets

(56) References Cited

U.S. PATENT DOCUMENTS

2021/0299878 A1* 9/2021 Konishi .................. B25J 9/163
2022/0180552 A1* 6/2022 Taniyasu ................ G01B 11/26
2023/0368414 A1* 11/2023 Afrooze ................ B25J 9/1697

FOREIGN PATENT DOCUMENTS

| JP | 2019-153309 A | 9/2019 |
| JP | 2019-181573 A | 10/2019 |
| JP | 2019185347 A * | 10/2019 |
| JP | 2020-075340 A | 5/2020 |
| JP | 2020-101437 A | 7/2020 |
| JP | 2020-180914 A | 11/2020 |
| JP | 2020-195336 A | 12/2020 |

* cited by examiner

OBJECT RECOGNITION DEVICE, OBJECT RECOGNITION METHOD, NON-TRANSITORY COMPUTER-READABLE MEDIUM, AND OBJECT RECOGNITION SYSTEM

This application is a National Stage Entry of PCT/JP2020/048760 filed on Dec. 25, 2020, the contents of all of which are incorporated herein by reference, in their entirety.

TECHNICAL FIELD

The present disclosure relates to an object recognition device, an object recognition method, a non-transitory computer-readable medium, and an object recognition system.

BACKGROUND ART

In recent years, in a distribution field, with a labor shortage as a background, an automated system causing a robot to automate work performed by a person has started to be introduced. In the automated system, various automated techniques including an image processing technique are used. As a device included in the automated system, for example, a device that specifies a target object by using a range point cloud (range point group) acquired by a red-green-blue (RGB)-depth (D) camera and a laser radar has been known (for example, Patent Literatures 1 and 2).

Patent Literature 1 discloses that a picking device generates three-dimensional point cloud information about a plurality of picking target objects as a whole, and outputs a position and pose of the picking target object, based on the generated three-dimensional point cloud information. Patent Literature 2 discloses that a three-dimensional position and pose recognition device includes an object recognition unit subjected to deep learning, and the object recognition unit performs object recognition on an image acquired by an image sensor, and specifies an object kind and a region in the image.

CITATION LIST

Patent Literature

[Patent Literature 1] Japanese Unexamined Patent Application Publication No. 2019-181573
[Patent Literature 2] Japanese Unexamined Patent Application Publication No. 2020-101437

SUMMARY OF INVENTION

Technical Problem

The technique disclosed in Patent Literature 1 outputs a position and pose of one kind of a picking target object. Thus, when a position and pose are required to be specified for a plurality of kinds of target objects, there is a possibility that a position of a target object cannot be specified even when the technique disclosed in Patent Literature 1 is used. The technique disclosed in Patent Literature 2 specifies an object kind of a target object and a region in an image by using an object identification unit subjected to deep learning. However, when many kinds of target objects are present and the object recognition unit is not sufficiently trained, a region of a target object may not be able to be specified.

One of objects of the present disclosure has been made in order to solve the problem described above, and is to provide an object recognition device, an object recognition method, a non-transitory computer-readable medium, and an object recognition system that are able to accurately specify a position and pose of a target object.

Solution to Problem

An object recognition device according to the present disclosure includes:
  a specification means for specifying an object region including a three-dimensional point cloud indicating a position of a surface of a target object, based on a three-dimensional point cloud generated by converting a distance image including distance information to the target object, and specifying a reference shape similar to the target object, based on a three-dimensional point cloud included in the object region and feature information about a reference shape; and
  an estimation means for estimating a reference position and a pose of the target object, based on a three-dimensional point cloud included in the object region and the specified reference shape.

An object recognition method according to the present disclosure is an object recognition method to be executed by an object recognition device, and includes:
  specifying an object region including a three-dimensional point cloud indicating a position of a surface of a target object, based on a three-dimensional point cloud generated by converting a distance image including distance information to the target object;
  specifying a reference shape similar to the target object, based on a three-dimensional point cloud included in the object region and feature information about a reference shape; and
  estimating a reference position and a pose of the target object, based on a three-dimensional point cloud included in the object region and the specified reference shape.

A non-transitory computer-readable medium according to the present disclosure is a non-transitory computer-readable medium storing a program causing a computer to execute processing of:
  specifying an object region including a three-dimensional point cloud indicating a position of a surface of a target object, based on a three-dimensional point cloud generated by converting a distance image including distance information to the target object;
  specifying a reference shape similar to the target object, based on a three-dimensional point cloud included in the object region and feature information about a reference shape; and
  estimating a reference position and a pose of the target object, based on a three-dimensional point cloud included in the object region and the specified reference shape.

An object recognition system according to the present disclosure is an object recognition system including:
  the object recognition device described above;
  an input device configured to input object information about a movement target and a destination position of a moving object indicated by object information about the movement target; and
  a robot device configured to move the object to the movement destination position, wherein the object recognition device further includes control means for selecting the object of the target object, based on the object information.

Advantageous Effects of Invention

The present disclosure is able to provide an object recognition device, an object recognition method, a non-transitory computer-readable medium, and an object recognition system that are able to accurately specify a position and pose of a target object.

EXAMPLE EMBODIMENT

Example embodiments of the present disclosure will be described below with reference to the drawings. Note that, for clarification of the description, the description and the drawings below are appropriately omitted and simplified. Further, in each of the drawings below, the same elements will be denoted by the same reference signs, and duplicate description will be omitted as necessary.

First Example Embodiment

Figure 1:
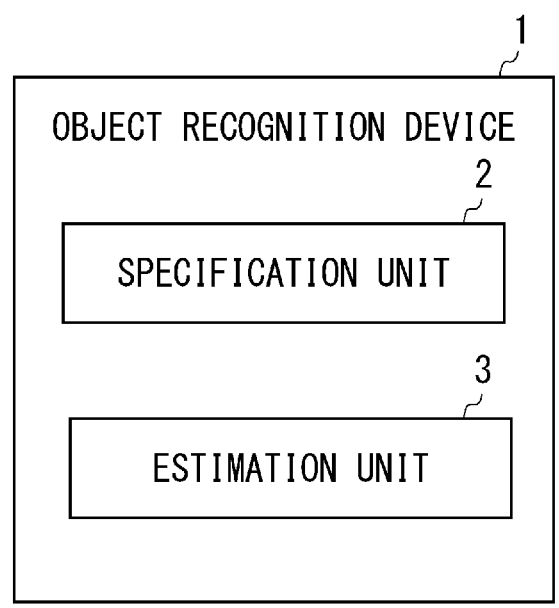
FIG. 1 is a diagram illustrating a configuration example of an object recognition device according to a first example embodiment.

A configuration example of an object recognition device 1 according to a first example embodiment will be described with reference to FIG. 1. FIG. 1 is a diagram illustrating a configuration example of the object recognition device according to the first example embodiment. The object recognition device 1 includes a specification unit 2 and an estimation unit 3.

The specification unit 2 specifies an object region including a three-dimensional point cloud indicating a position of a surface of a target object, based on the three-dimensional point cloud generated by converting a distance image including distance information to the target object. The target object is an object being an image-capturing target, and may be one object or may be two or more objects. The distance image includes distance information from an image-capturing device (not illustrated) to a target object being an image-capturing target, and is an image indicating a distance from the image-capturing device to the target object and a position of the target object with reference to a position of the image-capturing device. The distance image includes a plurality of points, and each of the plurality of points indicates a position of the target object with reference to the position of the image-capturing device and the distance from the image-capturing device to the target object. When a point included in the distance image is assumed to be a pixel, the distance image is an image in which each pixel is associated with a position in an image-capturing region being image-captured from the image-capturing device and a distance from the image-capturing device to the position is a pixel value. The three-dimensional point cloud is aggregated data of three-dimensional coordinates indicating a position generated by converting the distance image from a camera coordinate system into a world coordinate system. The camera coordinate system is a three-dimensional orthogonal coordinate system in which a position of the image-capturing device is an origin, two axes are provided on an image plane being image-captured by the image-capturing device, and a direction orthogonal to the image plane is a third axis. The world coordinate system is a three-dimensional orthogonal coordinate system in which any position in a three-dimensional space is an origin.

Note that the third-dimensional point cloud may be referred to as three-dimensional point cloud data, may be referred to as 3D point cloud data, and may be referred to as point cloud data. Thus, in the description below, the three-dimensional point cloud may be described as three-dimensional point cloud data, 3D point cloud data, point cloud data, or three-dimensional point cloud information. Further, each point included in the three-dimensional point cloud may be described as point data or a point.

The specification unit 2 specifies a reference shape similar to the target object, based on the three-dimensional point cloud included in the specified object region and feature information about the reference shape. The reference shape may include, for example, a cuboid, a cylinder, a sphere, and the like. The feature information may include normal vectors related information being related to normal vectors of a surface constituting the reference shape.

The estimation unit 3 estimates a reference position and a pose of the target object, based on the three-dimensional point cloud included in the object region and the reference shape specified by the specification unit 2. The reference position is a position that can specify a position of the target object. The reference position may be a center position of the target object, and may be a position of a point closest to the image-capturing device (not illustrated), may be a position farthest from the image-capturing device, and may be a position of an average value or a median of a distance to the image-capturing device, among positions of the target object. The pose may be information representing a displacement from a reference state of each target object, and may be represented by using a roll angle, a pitch angle, and a yaw angle. The reference state may be, for example, a state where a predetermined position on a surface of the target object is placed on a plane parallel to a horizontal plane, and is a state that can be set freely. Note that, in the description below, the roll angle, the pitch angle, and the yaw angle may be simply described as a roll, a pitch, and a yaw, respectively.

As described above, the object recognition device 1 can acquire a distance image, and specify an object region including a three-dimensional point cloud indicating a position of a surface of a target object, based on the three-dimensional point cloud acquired by converting the distance image. The object recognition device 1 can specify a reference shape similar to the target object, based on the three-dimensional point cloud included in the specified object region and feature information about the reference shape, and estimate a reference position and a pose of the target object by using the specified reference shape.

Herein, in Patent Literature 1 described above, a position and pose of one kind of a target object are specified. In contrast, the object recognition device 1 can specify a reference position and a pose of a target object by using feature information about a plurality of reference shapes even when there are a plurality of kinds of target objects. In other words, the object recognition device 1 can specify a position and pose of a target object by using feature information about a plurality of reference shapes even when a plurality of kinds of target objects are included. Further, since the object recognition device 1 uses feature information about a reference shape, the object recognition device 1 can specify an object region including a target object without requiring information about the target object, and can also estimate a position and pose of the target object. Therefore, the object recognition device 1 according to the first example embodiment can specify a reference position and a pose of a target object even when a plurality of kinds of target objects are included, and can accurately specify a position and pose of the target object as compared to the related technique.

Second Example Embodiment

Next, a second example embodiment will be described. The second example embodiment is an example embodiment acquired by embodying the first example embodiment.
<Configuration Example of Three-dimensional Object Recognition Device>

Figure 2:
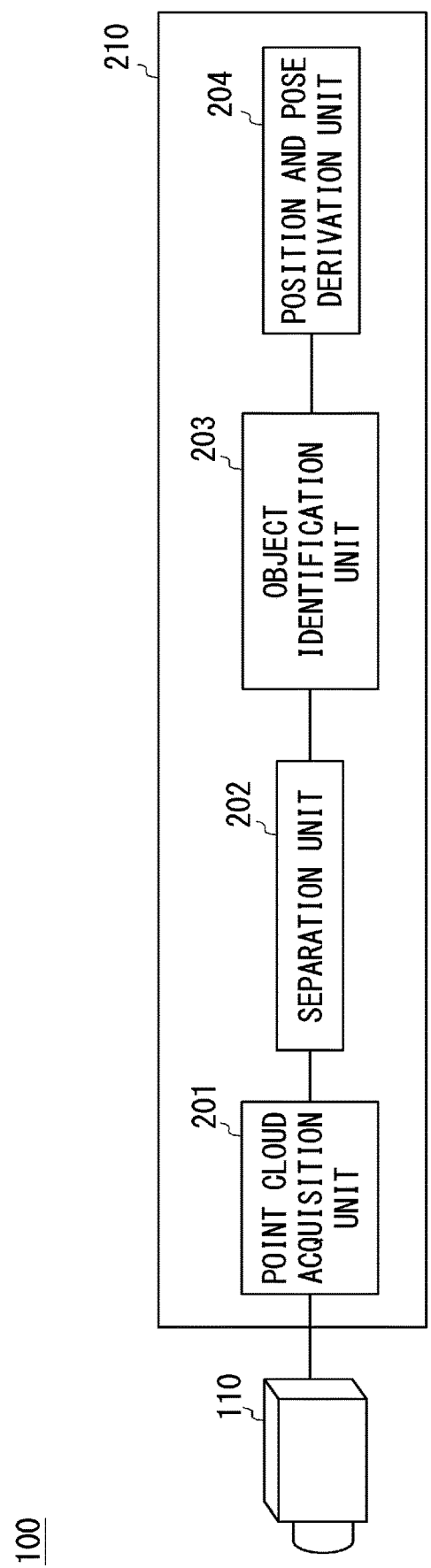
FIG. 2 is a diagram illustrating a configuration example of a three-dimensional object recognition device according to a second example embodiment.

A configuration example of a three-dimensional object recognition device 100 according to the second example embodiment will be described with reference to FIG. 2. FIG. 2 is a diagram illustrating the configuration example of the three-dimensional object recognition device according to the second example embodiment. The three-dimensional object recognition device 100 is, for example, a device that captures an image of a target object placed on a worktable, and estimates a reference position and a pose of the target object, based on an image-captured image. The three-dimensional object recognition device 100 is associated with the object recognition device 1 according to the first example embodiment.

The three-dimensional object recognition device 100 may be applied to a robot task, for example, and may be applied to a pick & place device. Further, the three-dimensional object recognition device 100 may be mounted on, for example, a movable body, such as an automatic that performs automatic driving and a drone, that detects an obstacle.

The three-dimensional object recognition device 100 includes a sensor unit 110 and a processing unit 210.

The sensor unit 110 includes an image-capturing device such as a stereo camera, a time of flight (ToF) camera, a millimeter wave radar, and a light detection and ranging laser imaging detection and ranging (LiDAR), for example. The sensor unit 110 applies laser light to a predetermined region of a worktable or the like, for example. At least one target object being an object as an image-capturing target is placed on the worktable. The sensor unit 110 receives laser light reflected by the target object of the laser light applied to the worktable, and generates a distance image including distance information about each point from the sensor unit 110 to the target object. The sensor unit 110 outputs the generated distance image to the processing unit 210.

The processing unit 210 specifies, based on the distance image generated by the sensor unit 110, an object region including a three-dimensional point cloud indicating a position of a surface of the image-captured target object, and estimates a reference position and a pose of the image-captured target object. The reference position is a position that can specify a position of the target object. The reference position may be a center position of the target object, and may be a position of a point closest to the sensor unit 110, may be a position farthest from the sensor unit 110, and may be a position of an average value or a median of a distance to the sensor unit 110, among positions of the target object. The processing unit 210 estimates the reference position of the target object by using the world coordinate system, based on the generated three-dimensional point cloud. Note that, in the description below, the reference position will be described as a center position of a target object.

The processing unit 210 derives, as a pose of each target object, a displacement from a reference state of each target object by using a roll angle, a pitch angle, and a yaw angle. The reference state may be, for example, a state where a predetermined position on a surface of the target object is placed on a plane parallel to a horizontal plane, and may be a state that can be set freely.

The processing unit 210 includes a point cloud acquisition unit 201, a separation unit 202, an object identification unit 203, and a position and pose derivation unit 204.

The point cloud acquisition unit 201 inputs the distance image being output from the sensor unit 110. The point cloud acquisition unit 201 converts the distance image from the camera coordinate system into the world coordinate system, and generates a three-dimensional point cloud in which each point indicates a position on the three-dimensional space. The three-dimensional point cloud is data representing a set of points indicated by using three-dimensional orthogonal coordinates in the world coordinate system. In other words, the three-dimensional point cloud is data representing a set of three-dimensional coordinates indicating a position on the three-dimensional space of each point included in a distance image.

As described above, the three-dimensional object recognition device 100 may be applied to a robot task and the like. Thus, in order to clarify a positional relationship between a target object and the sensor unit 110 or the like in a bird's-eye view, the point cloud acquisition unit 201 inputs a distance image, converts the distance image from the camera coordinate system into the world coordinate system, and generates a three-dimensional point cloud in the world coordinate system. The point cloud acquisition unit 201 outputs the generated three-dimensional point cloud to the separation unit 202. Note that the point cloud acquisition unit 201 generates a three-dimensional point cloud, and may thus be referred to as a three-dimensional (3D) point cloud acquisition unit. Further, in the description below, each axis of the three-dimensional orthogonal coordinate system being the world coordinate system will be described as an X-axis, a Y-axis, and a Z-axis. In other words, the world coordinate system will be described as an XYZ coordinate system.

The separation unit 202 inputs the three-dimensional point cloud being output from the point cloud acquisition unit 201. The separation unit 202 removes an unnecessary three-dimensional point cloud in such a way that a point constituting the target object becomes independent in the three-dimensional space in the XYZ coordinate system. The separation unit 202 removes an unnecessary three-dimensional point cloud by, for example, a plane removal method or a method for extracting an outline and removing a point cloud other than a specific region. When the separation unit 202 uses the plane removal method, the separation unit 202 derives coefficients a, b, c, and d in which coordinates (x, y, z) of a three-dimensional point cloud satisfy a condition of "$ax+by+cz+d\approx0$", by using random sample consensus (RANSAC), for example.

The separation unit 202 may set a threshold value $\theta$ for determining that the condition described above is satisfied, and derive coefficients a, b, c, and d that satisfy $|ax+by+cz+d|<\theta$. Note that the threshold value $\theta$ can be set according to performance of a camera used in the sensor unit 110 and an environment in which the three-dimensional object recognition device 100 is disposed. Then, the separation unit 202 may remove a three-dimensional point cloud that satisfies the condition of $ax+by+cz+d\approx0$ by using the derived coefficients. Alternatively, the separation unit 202 may set a threshold value $\rho$ and a threshold value $\varepsilon$ being two threshold values for determining that the condition described above is satisfied, and remove a three-dimensional point cloud (x, y, z) that satisfies $\rho<ax+by+cz+d<\varepsilon$. Note that the threshold value $\rho$ and the threshold value $\varepsilon$ may be decided in such a way that performance of the camera used in the sensor unit 110, an environment in which the three-dimensional object recognition device 100 is disposed, and the number of three-dimensional point clouds constituting a target object are maximum. The separation unit 202 outputs the three-dimensional point cloud after the unnecessary three-dimensional point cloud is removed to the object identification unit 203.

Note that the three-dimensional object recognition device 100 includes the sensor unit 110, the point cloud acquisition unit 201, and the separation unit 202, but the sensor unit 110, the point cloud acquisition unit 201, and the separation unit 202 may be provided outside. In this case, the object identification unit 203 described below may include an external interface, and the object identification unit 203 may be configured to input, via the external interface, the three-dimensional point cloud after the unnecessary three-dimensional point cloud is removed.

The object identification unit 203 is associated with the specification unit 2 according to the first example embodiment. The object identification unit 203 inputs the three-dimensional point cloud being output from the separation unit 202. The object identification unit 203 specifies, based on the input three-dimensional point cloud, an object region including the three-dimensional point cloud indicating a position of a surface of the target object being image-captured by the sensor unit 110. When a plurality of image-captured target objects are present, the object identification unit 203 specifies each object region including a three-dimensional point cloud indicating a position of a surface of each of the target objects.

Further, the object identification unit 203 specifies a reference shape similar to each image-captured target object, based on the three-dimensional point cloud included in the object region and feature information about the reference shape. The object identification unit 203 classifies the image-captured target object for each kind of a shape in such a way that the target object and a target object having a similar shape belong to the same kind. The object identification unit 203 specifies the number of the classified target objects for each kind of a shape.

The reference shape includes a so-called primitive shape such as a cuboid, a cylinder, and a sphere, for example. The feature information includes, for example, normal vector related information indicating information being related to normal vectors of a surface constituting the reference shape. The normal vector related information is information including at least one of a reference direction of normal vectors of a surface constituting a reference shape and a reference histogram distribution of the normal vectors. The reference direction is a direction of the normal vectors of the surface constituting the reference shape. The reference histogram distribution is a histogram distribution of the normal vectors of the surface constituting the reference shape. Note that the feature information may include length information about each side constituting the surface of the reference shape. Further, the reference shape may include a geometric shape other than a cuboid, a cylinder, and a sphere. In the description below, the reference shape may be described as a primitive shape.

Figure 3:
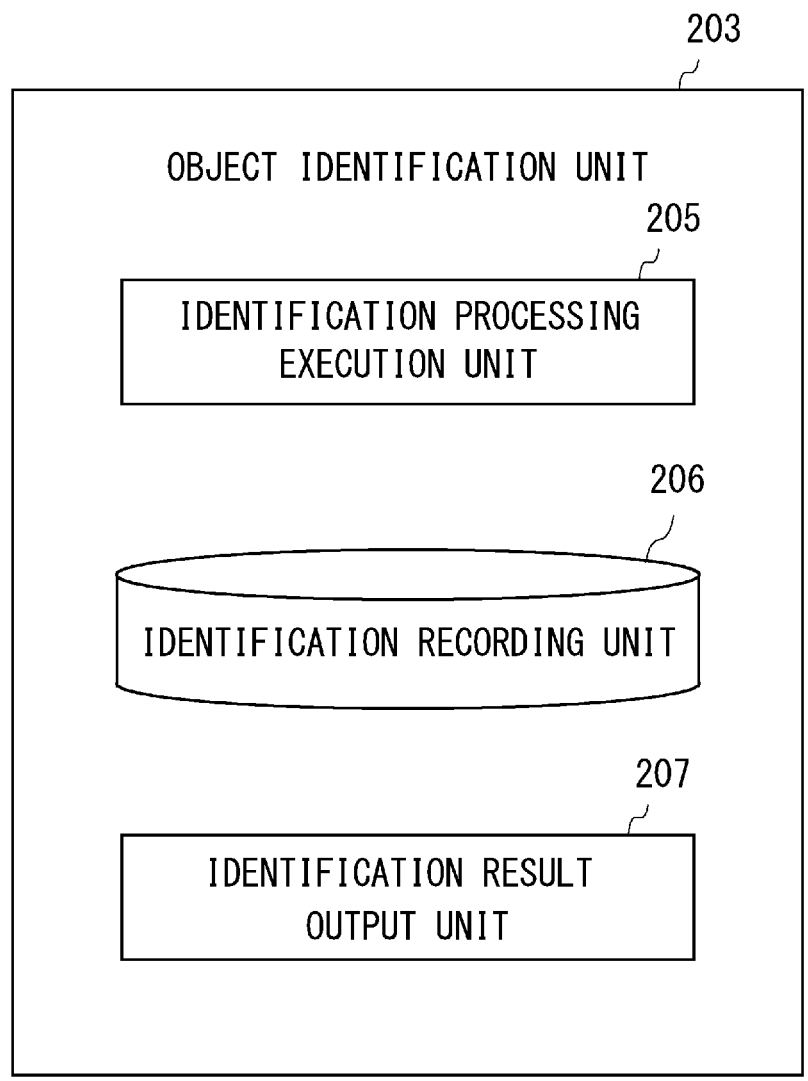
FIG. 3 is a diagram illustrating a detailed configuration example of an object identification unit according to the second example embodiment.

Herein, a detailed configuration of the object identification unit 203 will be described with reference to FIG. 3. FIG. 3 is a diagram illustrating a detailed configuration example of the object identification unit according to the second example embodiment. The object identification unit 203 includes an identification processing execution unit 205, an identification recording unit 206, and an identification result output unit 207.

The identification processing execution unit 205 inputs, from the separation unit 202, a three-dimensional point cloud after an unnecessary three-dimensional point cloud is removed. The identification processing execution unit 205 specifies an object region from the input three-dimensional point cloud, based on a distance between the three-dimensional point clouds. Specifically, the identification processing execution unit 205 extracts a three-dimensional point cloud having a distance to an adjacent point within a predetermined value from the input three-dimensional point clouds, and specifies the extracted three-dimensional point cloud as an object region. The predetermined value is a value for determining one object region, and may be a value being set by a user who uses the three-dimensional object recognition device 100. Alternatively, the predetermined value may be a calculated distance acquired by calculating a distance between a point and a point from resolution (point cloud density) of the sensor unit 110.

More specifically, the identification processing execution unit 205 selects an anchor point being a starting point from the input three-dimensional point cloud, and performs a neighbor search that searches for a vicinity point having a distance from the anchor point within the predetermined value. The identification processing execution unit 205 sets the found vicinity point as a new anchor point, and performs a next neighbor search. The identification processing execution unit 205 repeatedly performs the neighbor search until a vicinity point is not found, and specifies an object region. The identification processing execution unit 205 extracts a point having a distance to an adjacent point within the predetermined value from all points of the input three-dimensional point cloud, and specifies a set of the extracted points as the object region. In this way, by extracting a point having a distance to an adjacent point within the predetermined value from all points of the input three-dimensional point cloud, the identification processing execution unit 205 can specify an object region in which each target object is present even when a plurality of image-captured target objects are present, and can specify the number of the target objects.

The identification processing execution unit 205 specifies, for the specified object region, a reference shape similar to the target object included in the object region, based on the three-dimensional point cloud included in the specified object region and feature information about the reference shape. When a plurality of the specified target objects are present, the identification processing execution unit 205 specifies, for each of the specified object regions, a reference shape similar to the target object included in the object region.

The identification processing execution unit 205 generates, for each of the specified object regions, a plurality of planes formed of the three-dimensional point cloud included in the object region, and generates normal vectors of each of the plurality of planes. Specifically, the identification processing execution unit 205 connects, for each of the specified object regions, points included in the object region, and performs mesh processing of generating a plurality of quadrangular or triangular planes. The identification processing execution unit 205 generates a vector of each side of the plurality of planes generated by the mesh processing. For example, by acquiring an outer product of a vector with respect to each side of the plurality of planes, the identification processing execution unit 205 may generate normal vectors of the plurality of planes formed of the three-dimensional point cloud included in each of the object regions.

The identification processing execution unit 205 specifies a reference shape similar to each target object, based on the generated normal vectors and normal vector related information included in the feature information about the reference shape. Specifically, the identification processing execution unit 205 calculates a degree of similarity between at least one of a direction of the normal vectors generated for each plane and a histogram distribution, and at least one of a direction of normal vectors of a surface constituting the reference shape and a histogram distribution. The identification processing execution unit 205 specifies the reference shape similar to the target object included in the object region, based on the calculated degree of similarity.

For example, in a case of a cuboid, normal vectors calculated from a surface of the cuboid include many vectors having a component perpendicular to the surface. Noise and distortion occur in a distance image depending on performance of the sensor unit 110, and an error occurs when the mesh processing is performed and normal vectors are generated. Thus, all normal vectors calculated from a surface of a cuboid are ideally perpendicular to the surface. However, due to the error described above, calculated normal vectors include many vectors having a component perpendicular to a surface. Further, for example, in a case of a cylinder, normal vectors calculated from a side surface of the cylinder include many vectors having a component of various angles in general. Thus, the identification processing execution unit 205 calculates a degree of similarity between at least one of a direction of the generated normal vectors and a histogram distribution, and at least one of a reference direction of normal vectors of a surface constituting the reference shape and a histogram distribution. Then, the identification processing execution unit 205 specifies the reference shape similar to the target object included in the object region by using the calculated degree of similarity.

When the identification processing execution unit 205 specifies the reference shape similar to the target object included in the object region, the identification processing execution unit 205 assigns a kind identifier (ID) and a shape ID, based on the specified reference shape. For example, a unique shape ID is assigned for each reference shape, and the identification processing execution unit 205 assigns, for each object region, a shape ID associated with the specified reference shape to the target object included in the object region. In the present example embodiment, a kind of a target object is decided according to a similar reference shape. Thus, the identification processing execution unit 205 assigns a kind ID associated with a shape ID to each target object.

Further, the identification processing execution unit 205 further assigns an individual ID that can be uniquely identified in each kind ID to each target object assigned with the same kind ID. The three-dimensional object recognition device 100 may be applied to a robot task and a pick & place device, for example. A kind and the number of objects to be moved are more likely to be specified in the robot task and the pick & place device. Thus, the identification processing execution unit 205 provides a kind ID in such a way that a kind to which each target object belongs can be specified, and also provides an individual ID to each kind of each target object.

The identification processing execution unit 205 records, for each target object assigned with the kind ID and the individual ID, the shape ID and coordinates of the three-dimensional point cloud of the object region including the target object in association with each other in the identification recording unit 206. Note that the identification processing execution unit 205 may record, for each target object, a name of the reference shape similar to the target object further in association with the kind ID and the individual ID in the identification recording unit 206.

The identification recording unit 206 stores information about each target object in response to the control of the identification processing execution unit 205. The identification recording unit 206 stores the kind ID, the individual ID, the shape ID, and the coordinates of the three-dimensional point cloud included in the object region in association with one another. Note that, when the identification processing execution unit 205 records a name of the specified reference shape in the identification recording unit 206, the identification recording unit 206 may store the name of the reference shape further in association with the kind ID and the individual ID.

The identification result output unit 207 outputs, to the position and pose derivation unit 204, the kind ID, the individual ID, the shape ID, and the coordinates of the three-dimensional point cloud associated with the three IDs that are recorded in the identification recording unit 206 and are information about each target object.

Returning to FIG. 2, the position and pose derivation unit 204 will be described.

The position and pose derivation unit 204 is associated with the estimation unit 3 according to the first example embodiment. The position and pose derivation unit 204 estimates a center position and a pose of a target object included in an object region, based on a three-dimensional point cloud included in the object region and a reference shape similar to the target object included in the object region.

The position and pose derivation unit 204 inputs the information about the target object included in each object region. The position and pose derivation unit 204 inputs the kind ID, the individual ID, the shape ID, and the coordinates of the three-dimensional point cloud included in the object region.

The position and pose derivation unit 204 calculates, for each target object specified by a combination of the kind ID and the individual ID, a center point of the input three-dimensional point cloud of the object region. The position and pose derivation unit 204 estimates the calculated center point as a center position of the target object. The position and pose derivation unit 204 records, for the target object having the center position estimated, coordinates of the center position in association with the kind ID and the individual ID in the identification recording unit 206.

The position and pose derivation unit 204 approximates the target object included in the object region by the reference shape specified by the object identification unit 203, estimates an axis from the approximated reference shape, and estimates a pose of the target object, based on the estimated axis and a reference axis of the reference shape specified by the object identification unit 203. The reference axis is an axis constituting the reference shape specified by the object identification unit 203 when a virtual object of the reference shape is placed on the horizontal plane. The reference axis is predetermined for each reference shape. When the reference shape is a cylinder, the reference axis is in a center axis (pivot) direction. When the reference shape is a cuboid, the reference axis is in a normal direction of a surface having the largest area. The position and pose derivation unit 204 calculates an angle difference between the estimated axis and the reference axis, and estimates a pose of the target object by acquiring a roll angle, a pitch angle, and a yaw angle, based on the calculated angle difference. The position and pose derivation unit 204 records, for the target object having the pose estimated, the pose in association with the kind ID and the individual ID in the identification recording unit 206.

The position and pose derivation unit 204 specifies a primitive shape similar to the target object, based on the shape ID. The position and pose derivation unit 204 approximates the target object formed of the input three-dimensional point cloud of the object region to the primitive shape by using an equation representing the specified primitive shape. The position and pose derivation unit 204 calculates a pose from a difference in angle between an axis of the approximated primitive shape and a reference axis of the primitive shape.

For example, when the specified reference shape is a cuboid, the position and pose derivation unit 204 performs sampling from an input three-dimensional point cloud in such a way that coefficients of an equation $ax+by+cz+d=0$ representing a plane is affected as little as possible by an outlier. When the specified reference shape is a cuboid, an equation representing the cuboid being the primitive shape is the equation described above. The position and pose derivation unit 204 calculates values of coefficients a, b, c, and d that satisfy the equation described above and include a three-dimensional point cloud included in a plane of a target object by singular value decomposition, least squares method, and the like, and detects a plane having the largest area of the cuboid. The plane having the largest area is a plane having the largest area of a surface that can be image-captured (observed) by the sensor unit 110.

The position and pose derivation unit 204 calculates vertical and horizontal lengths of the detected planes from a direction of normal vectors of the detected planes. The position and pose derivation unit 204 calculates, for the detected planes, vertical and horizontal lengths of the detected planes from a distribution degree representing a spread of a distribution of the input three-dimensional point cloud. The position and pose derivation unit 204 calculates a length of each side of a plane being adjacent to the detected planes and being image-captured, based on the vertical and horizontal lengths of the detected planes and the distribution degree representing the spread of the distribution of the input three-dimensional point cloud, and approximates the target object to the cuboid.

Further, the position and pose derivation unit 204 decides, from a positional relationship between the three-dimensional point clouds included in the detected planes, whether the detected planes are upper surfaces of the cuboids or side surfaces of the cuboids. The upper surface of the cuboid is a surface parallel to a bottom surface when, for example, a surface of a plane of the cuboid closest to a plane of a worktable on which the target object is placed is the bottom surface. The side surface of the cuboid is a surface adjacent to the upper surface.

When the detected planes are the upper surfaces of the cuboids, for example, the position and pose derivation unit 204 may calculate a length (distance) of a depth of the cuboid from a distance between the plane of the worktable and the upper surface of the cuboid. The depth is a length of a side of the side surface of the cuboid, which is orthogonal to the upper surface of the cuboid, when the detected planes are the upper surfaces of the cuboids. The plane of the worktable can be estimated from the three-dimensional point cloud removed by the separation unit 202. Thus, the position and pose derivation unit 204 may calculate the depth of the cuboid, based on a distance between the three-dimensional point cloud included in the upper surface of the cuboid and the three-dimensional point cloud removed by the separation unit 202.

When the detected planes are the side surfaces of the cuboids, the position and pose derivation unit 204 may set, as the depth, a distance between a point in a position farthest from the sensor unit 110 among points included in the detected planes, and a point in a position closest to the sensor unit 110 among the points included in the detected planes. The position and pose derivation unit 204 may estimate a length of a side of the upper surface of the cuboid, which is orthogonal to the side surface of the cuboid, based on a distance between the point in the position closest to the sensor unit 110 among the points included in the detected planes, and the three-dimensional point cloud removed by the separation unit 202.

The position and pose derivation unit 204 estimates, as each axis of the cuboid, a direction perpendicular to each plane of the approximated cuboid. The position and pose derivation unit 204 estimates a pose of the target object by calculating an angle difference between each axis of the estimated cuboid and each axis of a cuboid when a virtual object of the cuboid is placed on the horizontal plane. Note that the position and pose derivation unit 204 may estimate each axis of the cuboid by performing a principal component analysis on the input three-dimensional point cloud, and approximate the target object to the cuboid by generating the cuboid including all the input three-dimensional point cloud for each axis.

Note that, in the description above, the primitive shape is assumed to be the cuboid for convenience of the description, but the primitive shape may be a polyhedron acquired by generalizing the cuboid. In this case, the position and pose derivation unit 204 can approximate a target object to the polyhedron by estimating a length of each side of an adjacent plane with reference to a length of each side of detected planes. The position and pose derivation unit 204 can calculate a pose from a difference in angle between an axis of the approximated polyhedron and a reference axis of the polyhedron.

For example, when the specified reference shape is a cylinder, the position and pose derivation unit 204 can represent a side surface of the cylinder where a circle having a radius r with the center of a bottom surface of the cylinder as an origin O' is a bottom surface, a center axis is a z' axis, and a point on the bottom surface of the cylinder is (x', y'):

$$x'^2 + y'^2 - r^2 = 0$$

The position and pose derivation unit 204 estimates, from a Newton's method and the like, the center and a radius that satisfy the following the most where coordinates of the center of the bottom surface of the cylinder are (x0, y0, z0) and a point present on a circular arc of the bottom surface of the cylinder is (xi, yi, zi) (i=1 to m, m: an integer of two or more):

$$(x0 - x_i)^2 + (y0 - y_i)^2 + (z0 - z_i)^2 = r^2 \approx 0$$

When the specified reference shape is the cylinder, an equation representing the cylinder being the primitive shape is the equation described above. The position and pose derivation unit 204 performs a content similar to the content described above on a point on a center axis being different from the center of the bottom surface, and a point present on a circular arc of a surface parallel to the bottom surface with reference to the point, and estimates coordinates of the point on the center axis being different from the center of the bottom surface. Then, the center axis and a radius of the cylinder may be estimated by estimating a vector of the center axis from the estimated coordinates of the center of the bottom surface and the coordinates of the point on the center axis. The position and pose derivation unit 204 generates a cylinder including a greatest number of points of the input three-dimensional point cloud, based on the estimated vector and radius of the center axis, and approximates the target object to the generated cylinder. The position and pose derivation unit 204 estimates a pose of the target object by calculating an angle difference between the vector of the center axis and the center axis when the generated cylinder is placed on the horizontal plane.

For example, when the specified reference shape is a sphere, the position and pose derivation unit 204 estimates the center and a radius that satisfy the following the most where coordinates of the center of the sphere are (e, f, g), the radius is r, and a point present in the sphere is (xi, yi, zi) (i=1 to m, m: an integer of two or more):

$$(x_i - e)^2 + (y_i - f)^2 + (z_i - g)^2 - r^2 \approx 0$$

The position and pose derivation unit 204 estimates the center and the radius that satisfy the equation of the sphere described above the most by using RANSAC and the like. When the specified reference shape is the sphere, an equation representing the sphere being the primitive shape is the equation described above. For example, the position and pose derivation unit 204 may set, in advance, pose information being a reference for the sphere, and estimate a pose of the target object, based on the set pose information being the reference. Alternatively, the position and pose derivation unit 204 specifies a direction of normal vectors, based on an average value or a median of the normal vectors. The position and pose derivation unit 204 may estimate a pose of the target object having a reference shape specified as a sphere, based on the direction of the normal vectors. Alternatively, when the reference shape specified by the object identification unit 203 includes at least one of a cuboid and a cylinder other than a sphere, the position and pose derivation unit 204 may estimate, as a pose of the target object having the reference shape specified as the sphere, a pose of the target object having the reference shape specified other than the sphere.

Note that the position and pose derivation unit 204 may perform a principal component analysis on a three-dimensional point cloud included in an object region without approximating a target object included in the object region to a primitive shape, and may estimate an axis constituting the target object. In many cases, the three-dimensional point cloud included in the object region tends to spread in an axis direction according to a shape of the target object. Thus, the position and pose derivation unit 204 may estimate an axis constituting the target object by performing a principal component analysis on the input three-dimensional point cloud. Then, the position and pose derivation unit 204 may estimate a pose of the target object, based on an angle difference between the estimated axis and a reference axis of a reference shape specified for each target object. Further, the position and pose derivation unit 204 may further use shape information about a reference shape specified for each target object when the position and pose derivation unit 204 performs a principal component analysis on the input three-dimensional point cloud. The position and pose derivation unit 204 can easily specify an axis to be estimated by using the shape information about the reference shape when the position and pose derivation unit 204 performs the principal component analysis.

<Operation Example of Three-dimensional Object Recognition Device>

Figure 4:
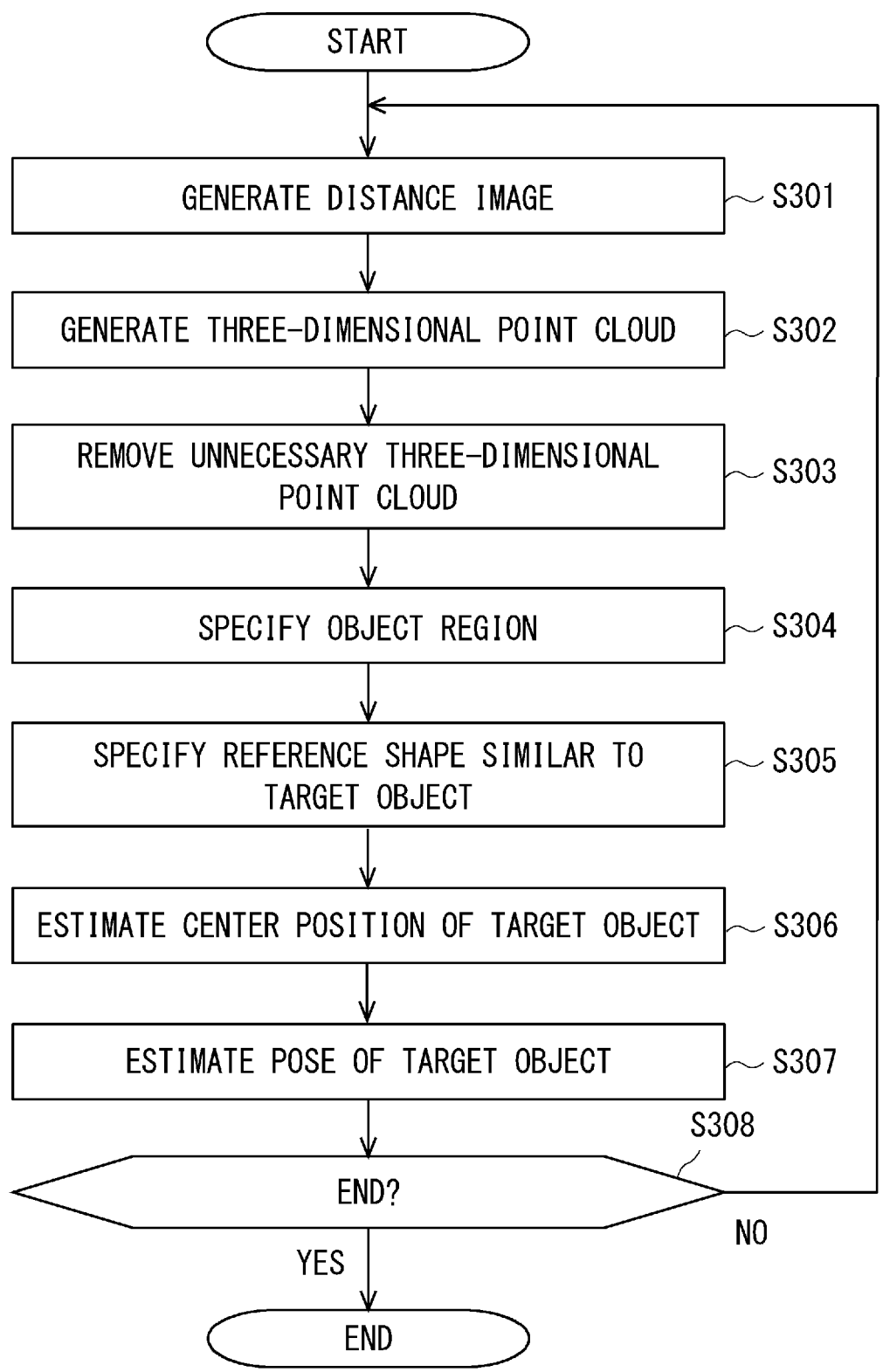
FIG. 4 is a diagram illustrating an operation example of the three-dimensional object recognition device according to the second example embodiment.

Next, an operation example of the three-dimensional object recognition device 100 will be described. First, an overall operation of the three-dimensional object recognition device 100 will be described with reference to FIG. 4. FIG. 4 is a diagram illustrating the operation example of the three-dimensional object recognition device according to the second example embodiment.

The sensor unit 110 captures an image of a predetermined region of a worktable and the like, and generates a distance image including distance information about each point from the sensor unit 110 to a target object (step S301).

The point cloud acquisition unit 201 converts the distance image from the camera coordinate system into the world coordinate system, and generates a three-dimensional point cloud in which each point indicates a position on the three-dimensional space (step S302).

The separation unit 202 removes an unnecessary three-dimensional point cloud in such a way that a point constituting the target object becomes independent in the three-dimensional space by, for example, a plane removal method or a method for extracting an outline and removing a point cloud other than a specific region (step S303).

The object identification unit 203 inputs the three-dimensional point cloud being output from the separation unit 202, and specifies an object region including each target object, based on the input three-dimensional point cloud (step S304).

Specifically, the identification processing execution unit 205 inputs the three-dimensional point cloud from the separation unit 202. The identification processing execution unit 205 extracts a point having a distance to an adjacent point within a predetermined value from all points of the input three-dimensional point cloud, and specifies a set of the extracted points as the object region. Note that a detailed operation of step S304 will be described below.

The object identification unit 203 specifies a reference shape similar to the target object included in the object region, based on the three-dimensional point cloud included in the object region and feature information about the reference shape (step S305). Note that, when a plurality of the object regions specified in step S304 are present, steps S305 to S307 are repeatedly performed on each of the specified object regions.

Specifically, the identification processing execution unit 205 generates, for each of the specified object regions, a plurality of planes formed of the three-dimensional point cloud included in the object region, and generates normal vectors of each of the plurality of planes. The identification processing execution unit 205 specifies a reference shape similar to each target object, based on the generated normal vectors and normal vector related information. The identification processing execution unit 205 calculates a degree of similarity between the target object included in the object region and each reference shape, based on a direction of the normal vectors generated for each plane and a reference direction of normal vectors of a surface constituting the reference shape. Furthermore, the identification processing execution unit 205 may calculate a degree of similarity between the target object included in the object region and each reference shape, based on a histogram distribution of the normal vectors generated for each plane and a reference histogram distribution of a surface constituting the reference shape. The identification processing execution unit 205 specifies the reference shape similar to the target object included in the object region, based on the calculated degree of similarity.

The position and pose derivation unit 204 estimates a center position of the target object included in the object region, based on the three-dimensional point cloud included in the object region (step S306).

Specifically, the position and pose derivation unit 204 inputs a kind ID, an individual ID, and coordinates of the three-dimensional point cloud constituting the specified reference shape. The position and pose derivation unit 204 calculates, for each target object specified by a combination of the kind ID and the individual ID, a center point of the input three-dimensional point cloud of the object region. The position and pose derivation unit 204 estimates the calculated center point as a center position of the target object.

The position and pose derivation unit 204 estimates a pose of the target object included in the object region, based on the three-dimensional point cloud included in the object region and the reference shape similar to the target object included in the object region (step S307).

Specifically, the position and pose derivation unit 204 approximates the target object included in the object region to the reference shape specified by the object identification unit 203, estimates an axis from the approximated reference shape, and estimates a pose of the target object, based on the estimated axis and a reference axis of the reference shape specified by the object identification unit 203.

The three-dimensional object recognition device 100 determines whether a user ends the processing (step S308).

When there is no command for the end from the user (NO in step S308), the three-dimensional object recognition device 100 performs the processing in and after step S301 again.

On the other hand, when the command for the end from the user is received (YES in step S308), the three-dimensional object recognition device 100 ends the processing.

Next, the detailed operation performed in step S304 will be described with reference to FIGS. 5 to 9. FIGS. 5 to 9 are diagrams illustrating an operation example of the three-dimensional object recognition device according to the second example embodiment, and are diagrams illustrating the detailed operation of step S304.

Figure 5:
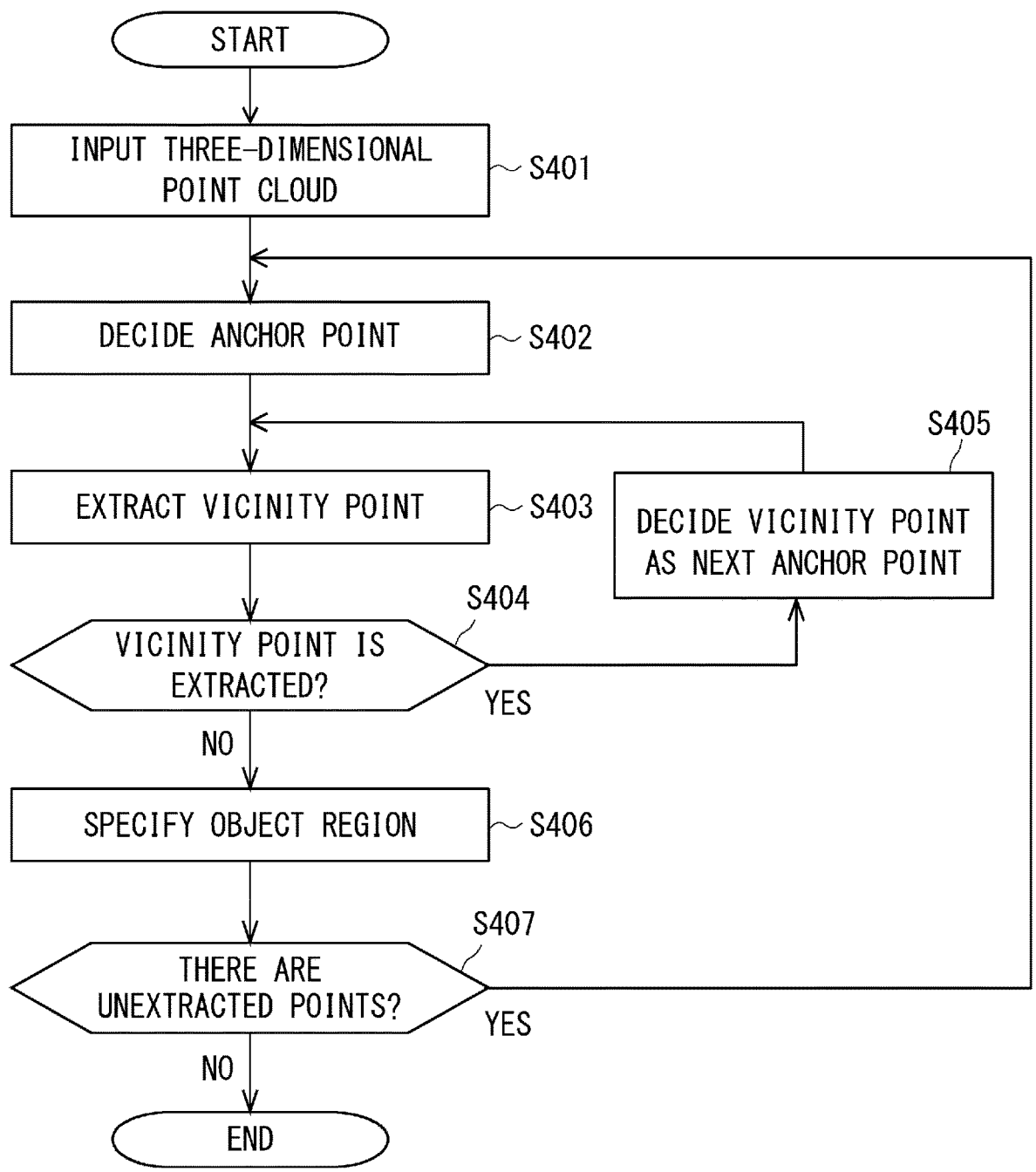
FIG. 5 is a diagram illustrating an operation example of the three-dimensional object recognition device according to the second example embodiment.

First, the detailed operation performed in step S304 will be described with reference to a flowchart illustrated in FIG. 5. The flowchart illustrated in FIG. 5 is performed by the identification processing execution unit 205 included in the object identification unit 203.

The identification processing execution unit 205 inputs the three-dimensional point cloud from the separation unit 202 (step S401).

The identification processing execution unit 205 decides, from the input three-dimensional point cloud, an anchor point being a starting point of a neighbor search (step S402).

The identification processing execution unit 205 may decide, as an anchor point, a point being randomly selected from the input three-dimensional point cloud. Alternatively, the identification processing execution unit 205 may decide, as a first anchor point, a center point of the input three-dimensional point cloud. Alternatively, the identification processing execution unit 205 may extract a region having a high density of the three-dimensional point cloud from a distribution of the input three-dimensional point cloud, and set, as an anchor point, the center of the three-dimensional point cloud included in one region selected from the extracted regions. The three-dimensional point cloud included in the extracted region is located on a surface of a target object that can be image-captured (can be observed) among surfaces of target objects, and thus a center point of the extracted three-dimensional point cloud can be estimated as the center of an object surface that can be observed. Thus, the identification processing execution unit 205 may regard the center point of the extracted three-dimensional point cloud as the center of the object surface that can be observed, and decide the center point as an anchor point. Alternatively, the identification processing execution unit 205 may extract a region having a high density of the three-dimensional point cloud from a distribution of the input three-dimensional point cloud, and estimate an outline of the three-dimensional point cloud in one region selected from the extracted regions. Then, the identification processing execution unit 205 may decide a center point of the estimated outline as an anchor point.

The identification processing execution unit 205 extracts, from the three-dimensional point cloud except for an extracted point among the input three-dimensional point clouds, a point having a distance to the anchor point within a predetermined value as a vicinity point (step S403).

The identification processing execution unit 205 determines whether the vicinity point is extracted in step S403 (step S404).

When the vicinity point is extracted (YES in step S404), the identification processing execution unit 205 sets the current anchor point as an extracted point, and decides the extracted vicinity point as a next anchor point (step S405).

The identification processing execution unit 205 decides the next anchor point, and performs step S403. In other words, the identification processing execution unit 205 extracts a vicinity point of a decided anchor point with reference to the decided anchor point.

On the other hand, when the vicinity point is not extracted (NO in step S404), the identification processing execution unit 205 specifies, as the object region, a point extracted as a vicinity point of the anchor point decided in steps S402 and S405 (step S406).

The identification processing execution unit 205 specifies, as one object region, a point extracted as a vicinity point until the vicinity point is not extracted with the anchor point decided in step S402 as a starting point, and the point decided as the anchor point decided in step S402. The identification processing execution unit 205 changes the point being the anchor point in step S406 to an extracted point.

Note that the anchor point decided in step S402 is one, but it is assumed that there are a plurality of the anchor points decided in step S405. When there are the plurality of anchor points, the identification processing execution unit 205 performs steps S403 to S405 on each of the anchor points. When the determination in step S404 is NO for each of the anchor points, the identification processing execution unit 205 does not perform step S405 on the anchor point. Then, when a vicinity point is not extracted for all the anchor points, the identification processing execution unit 205 performs step S406.

The identification processing execution unit 205 determines whether, in the input three-dimensional point cloud, there is an unextracted point that is not classified into any of an extracted point, a point as an anchor point, and a vicinity point, and is not subjected to extraction processing (step S407).

When there is the unextracted point (YES in step S407), the identification processing execution unit 205 performs the operation in step S402, and decides an anchor point for specifying a next object region.

On the other hand, when there is no unextracted point (NO in step S407), the identification processing execution unit 205 performs the processing on the input three-dimensional point cloud, and thus ends the processing and performs step S305 in FIG. 4.

Figure 7:
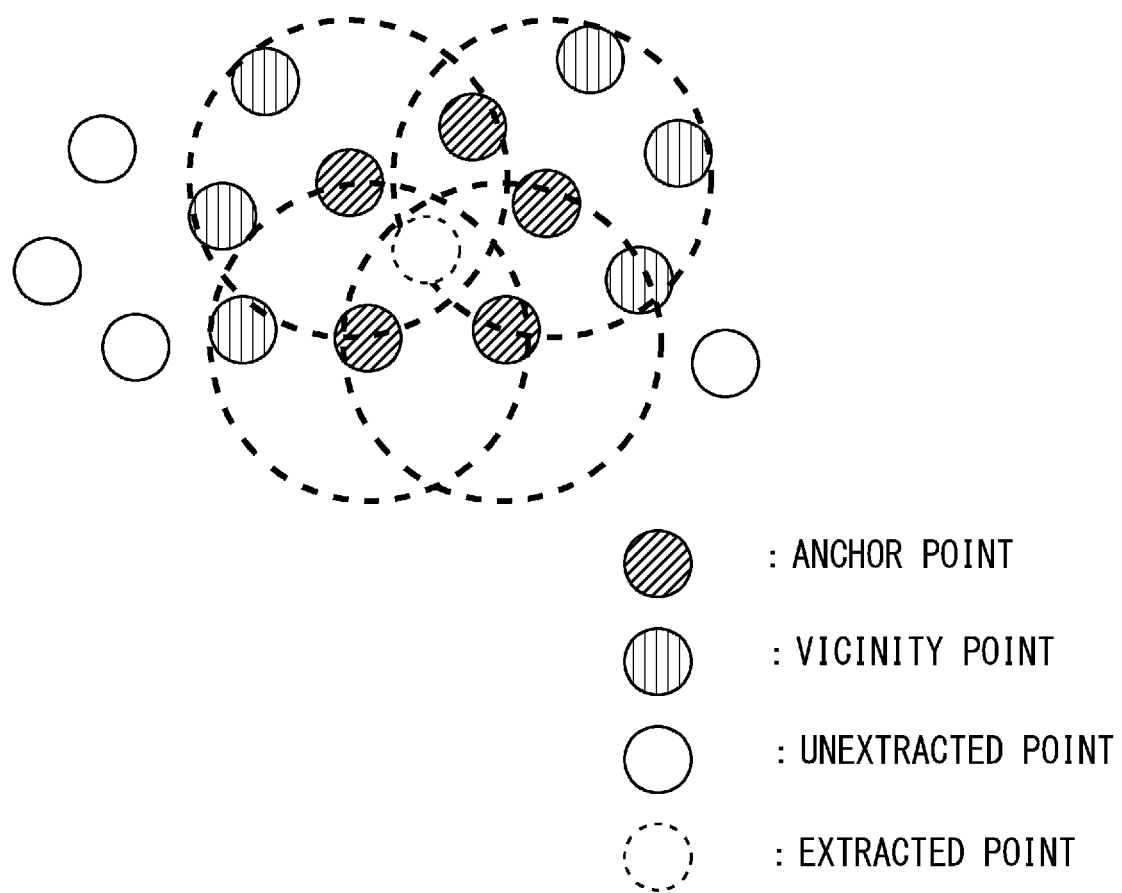
FIG. 7 is a diagram illustrating an operation example of the three-dimensional object recognition device according to the second example embodiment.
Figure 8:
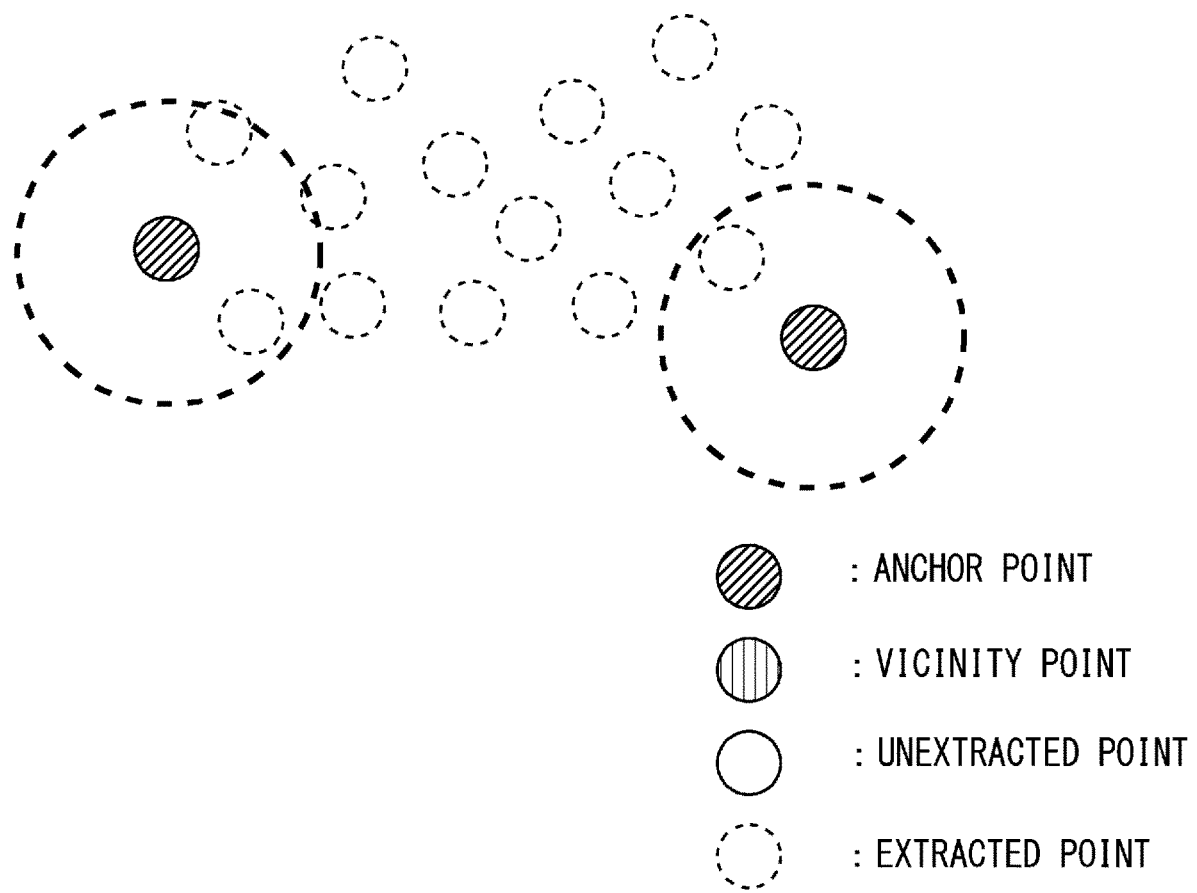
FIG. 8 is a diagram illustrating an operation example of the three-dimensional object recognition device according to the second example embodiment.

Next, a state of the three-dimensional point cloud in each step described in FIG. 5 will be described with reference to FIGS. 6 to 8. As a premise, a circle mark illustrated in FIGS. 6 to 8 indicates each point of the three-dimensional point cloud being input in step S401 in FIG. 5.

Figure 6:
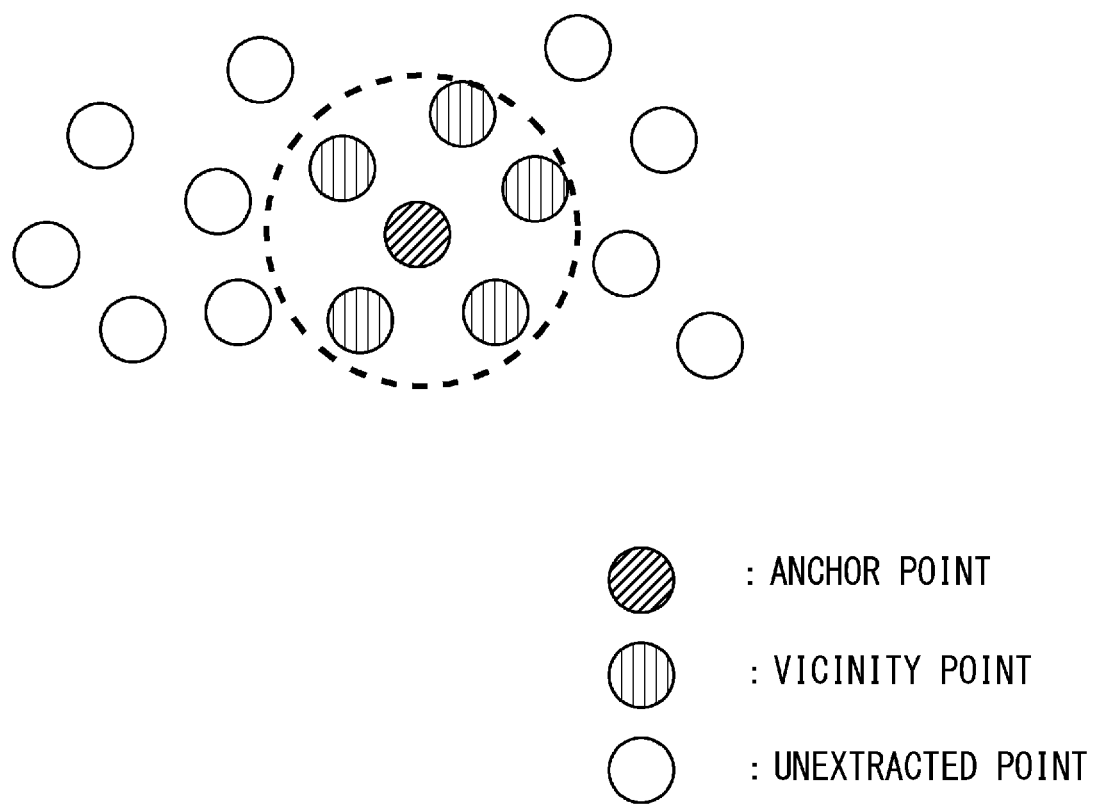
FIG. 6 is a diagram illustrating an operation example of the three-dimensional object recognition device according to the second example embodiment.

FIG. 6 is a diagram illustrating the operation in steps S402 and S403. In step S402, the identification processing execution unit 205 decides an anchor point from the input three-dimensional point cloud. It is assumed that the identification processing execution unit 205 decides a circle mark hatched with oblique lines in FIG. 6 as an anchor point.

In step S403, the identification processing execution unit 205 extracts, from the three-dimensional point cloud except for an extracted point among the input three-dimensional point clouds, a point having a distance to the anchor point within a predetermined value as a vicinity point. A dotted line in FIG. 6 is a circle representing a position in which a distance from the anchor point has the predetermined value with the anchor point as the center. A circle mark hatched with vertical lines in FIG. 6 represents the vicinity point extracted by the identification processing execution unit 205. The identification processing execution unit 205 extracts, as the vicinity point, a point in the circle indicated by the dotted line.

Next, FIG. 7 will be described. FIG. 7 is a diagram illustrating steps S404, S405, and S403 in FIG. 5. In step S404, the identification processing execution unit 205 determines whether a vicinity point is extracted. As illustrated in FIG. 6, the identification processing execution unit 205 extracts the vicinity point. Thus, in step S405, the identification processing execution unit 205 sets, as an extracted point, the anchor point in FIG. 6 being the current anchor point. A circle mark (small circle of a dotted line) of a thin dotted line in FIG. 7 indicates the extracted point, and the identification processing execution unit 205 sets the anchor point in FIG. 6 as the extracted point. Then, the identification processing execution unit 205 decides the vicinity point in FIG. 6 as an anchor point for searching for a next vicinity point. The identification processing execution unit 205 performs the operation in step S403, and extracts a vicinity point of the anchor point decided in step S405.

Next, FIG. 8 will be described. FIG. 8 is a diagram illustrating steps S406 and S407. The identification processing execution unit 205 repeatedly performs steps S403 and S405 until a vicinity point is not extracted. As illustrated in FIG. 8, when only an extracted point is present at a distance from an anchor point within the predetermined value and a vicinity point is not extracted, the identification processing execution unit 205 determines that a target object is present in a region including the extracted point in FIG. 8 and the current anchor point. The identification processing execution unit 205 specifies, as the object region, the region including the extracted point in FIG. 8 and the current anchor point. Note that an unextracted point is not present in FIG. 8, but when the unextracted point is located outside a thick dotted line, the identification processing execution unit 205 returns to step S402, and decides an anchor point for searching for a next object region.

Figure 9:
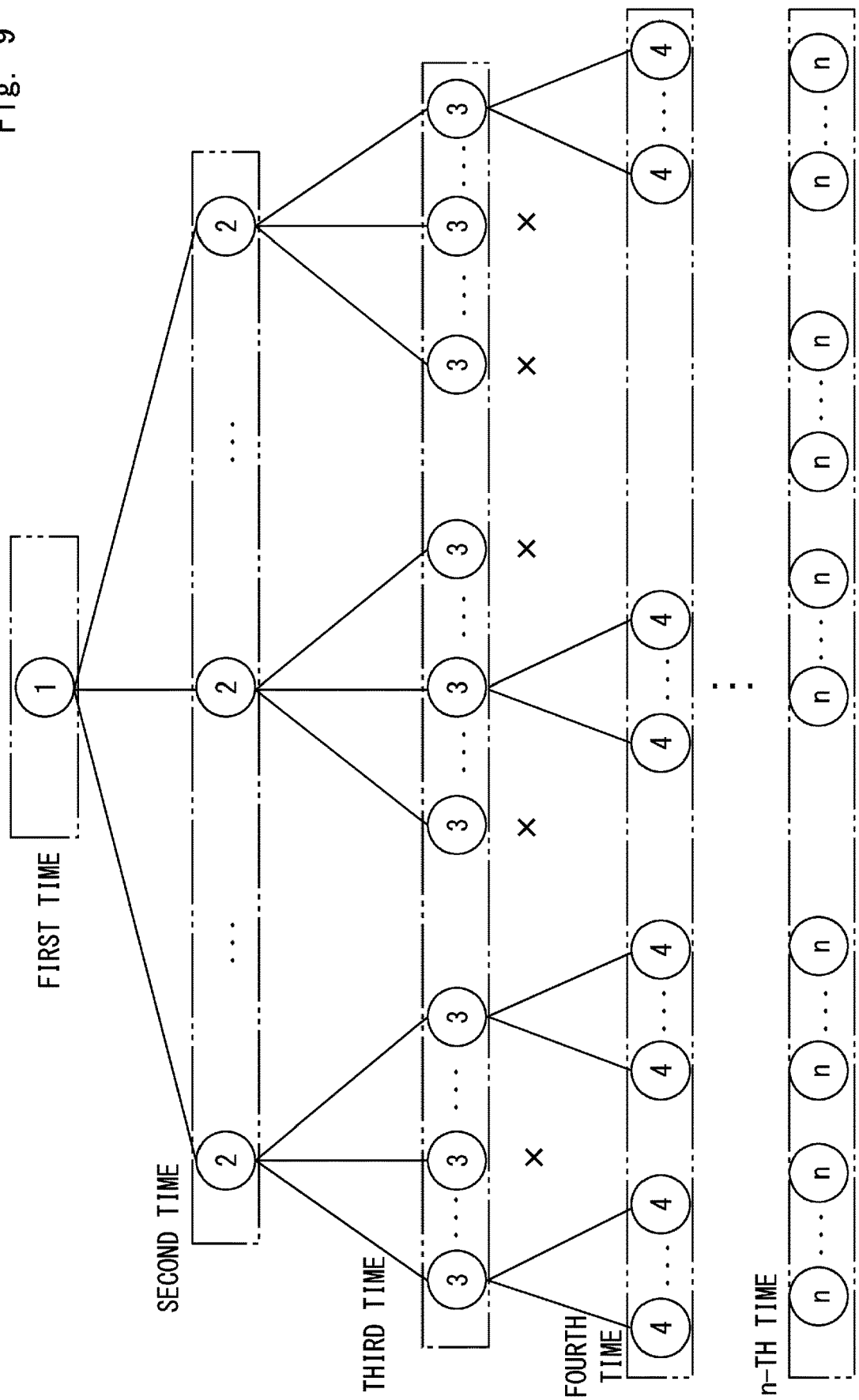
FIG. 9 is a diagram illustrating an operation example of the three-dimensional object recognition device according to the second example embodiment.

Next, a scene where a vicinity point of an anchor point is extracted by a neighbor search by using a tree display will be described with reference to FIG. 9. Note that the neighbor search refers to the operation in step S402 to S405 among the operations in FIG. 5. In FIG. 9, a small circle with a number represents a node and indicates an anchor point. The number described in each node indicates the number of times a neighbor search is performed, and is a number representing an anchor point in what number the neighbor search is. A branch (line) extending downward from each node indicates a vicinity point extracted from an anchor point. In other words, a vicinity point extracted from a certain anchor point represents that the vicinity point becomes an anchor point in a next neighbor search. For an anchor point having no vicinity point being extracted, an X mark is described below a circle indicating the anchor point, and it is indicated that an unextracted point is not present in a position at a distance from the anchor point within the predetermined value, and processing on the anchor point ends.

As illustrated in FIG. 9, the identification processing execution unit 205 extracts, for each anchor point for performing a k-th (k is an integer of one or more) neighbor search, a vicinity point by searching for a point within a predetermined distance from the anchor point. Then, the identification processing execution unit 205 sets the extracted vicinity point as an anchor point for performing a (k+1)-th neighbor search, performs the (k+1)-th neighbor search, and extracts a vicinity point. The identification processing execution unit 205 repeatedly performs the neighbor search on each anchor point, and extracts a vicinity point until the vicinity point is not searched. When the vicinity point is not extracted for all the anchor points, the identification processing execution unit 205 specifies, as an object region, points associated with all nodes when the vicinity point is not extracted for the first time.

Note that, as the number of times of a neighbor search increases, there is a possibility that a processing load on the three-dimensional object recognition device 100 increases. Further, when an unnecessary point handled as noise is included in an input three-dimensional point cloud, there is a possibility that an object region specified by the identification processing execution unit 205 is an unexpectedly large region. Thus, the identification processing execution unit 205 may end neighbor search processing when a threshold value is provided for at least one of the number of times a neighbor search is performed and a distance from a first anchor point to an extracted vicinity point, and the threshold value is exceeded.

As described above, the object identification unit 203 can extract a three-dimensional point cloud independent on a space by using a distance between a point and a point in the three-dimensional point cloud based on a distance image, and can specify an object region including the three-dimensional point cloud indicating a position of a surface of an image-captured target object by using only the three-dimensional point cloud of the target object. In other words, the three-dimensional object recognition device 100 according to the second example embodiment can specify the number of target objects by using a three-dimensional point cloud based on a distance image.

Further, the object identification unit 203 specifies a reference shape similar to a target object included in an object region by using a reference shape being a primitive shape, and the position and pose derivation unit 204 specifies a center position and a pose by using the specified reference shape. Since the object identification unit 203 and the position and pose derivation unit 204 use the reference shape being the primitive shape, the object identification unit 203 and the position and pose derivation unit 204 can classify a plurality of kinds of target objects into a kind based on the reference shape similar to the target object even when the plurality of kinds of target objects are included, and can estimate a position and pose of all the target objects. In other words, the three-dimensional object recognition device 100 according to the second example embodiment can accurately specify a position and pose of a target object even when a plurality of kinds of target objects are included.

Furthermore, the three-dimensional object recognition device 100 can specify a position and pose of a target object with only a distance image. In general, when a color image such as an RGB image is used, a lot of noise called overexposure are included in the image in an environment in which an influence of illumination is strong, and accuracy of estimating a position and pose of a target object is greatly affected by the illumination. In contrast, the three-dimensional object recognition device 100 according to the second example embodiment can specify a center position and a pose of a target object with only a distance image, and is thus robust against a change in lighting and can estimate the center position and the pose of the target object without being affected by illumination.

Third Example Embodiment

Next, a third example embodiment will be described. In the second example embodiment, the three-dimensional object recognition device estimates a center position and a pose of an image-captured target object by using a distance image, but, in the third example embodiment, a three-dimensional object recognition device estimates a center position and a pose of a target object by using an RGB image being a color image in addition to the distance image.

<Configuration Example of Three-dimensional Object Recognition Device>

Figure 10:
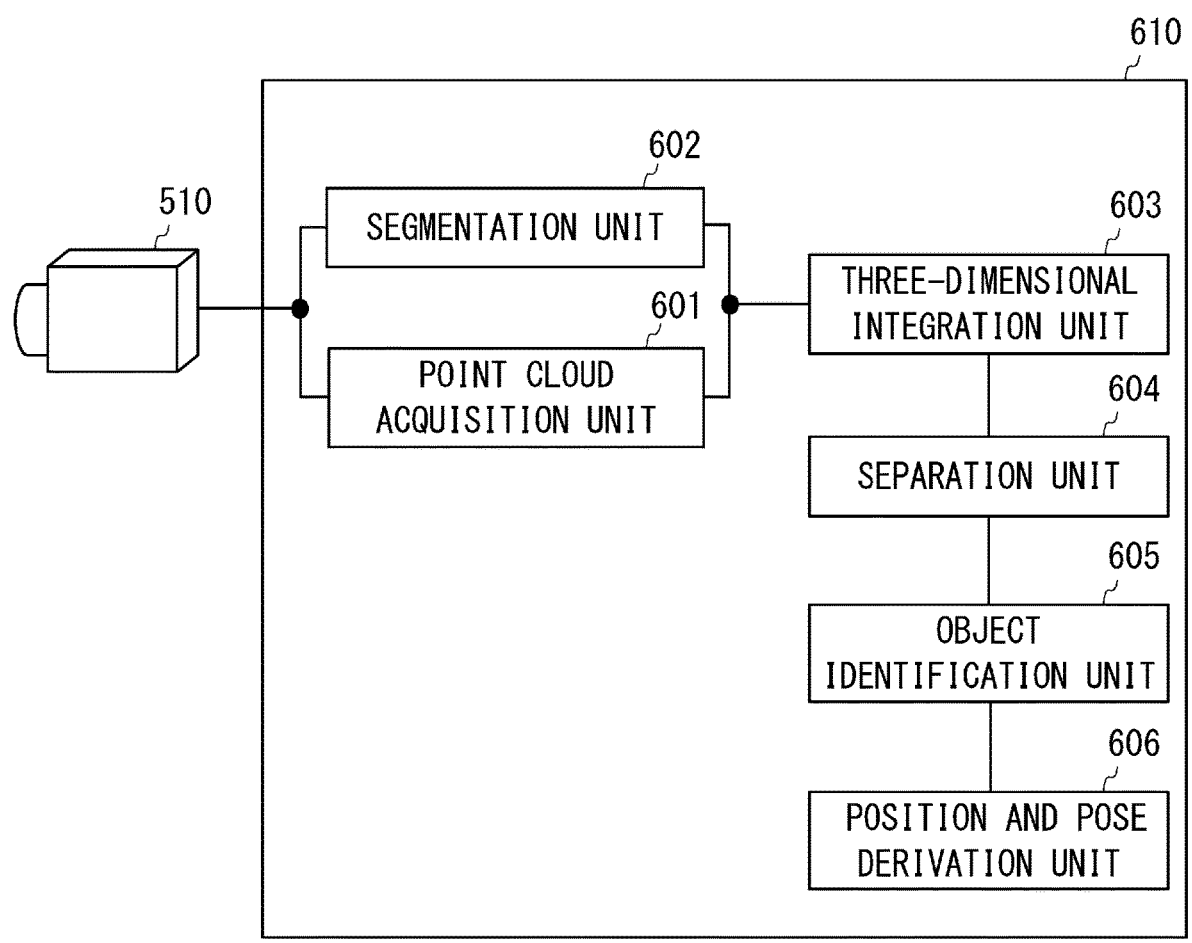
FIG. 10 is a diagram illustrating a configuration example of a three-dimensional object recognition device according to a third example embodiment.

A configuration example of a three-dimensional object recognition device 500 according to the third example embodiment will be described with reference to FIG. 10. FIG. 10 is a diagram illustrating the configuration example of the three-dimensional object recognition device according to the third example embodiment. The three-dimensional object recognition device 500 is, for example, a device that captures an image of a target object placed on a worktable, and estimates a center position and a pose of the image-captured target object, based on a color image and a distance image that are image-captured. Note that, in the description below, the color image will be described as an RGB image, but may be another color image such as a hue, saturation, value of brightness (HSV) image.

The three-dimensional object recognition device 500 includes a sensor unit 510 and a processing unit 610.

The sensor unit 510 includes an image-capturing device that can image-capture a distance image and an RGB image. For example, the sensor unit 510 captures an image of a predetermined region including a target object placed on a worktable, and generates an RGB image and a distance image being images in the camera coordinate system. The sensor unit 510 outputs the generated RGB image and the generated distance image to the processing unit 610. Note that, also in the present example embodiment, the sensor unit 510 may be provided outside the three-dimensional object recognition device 500.

The processing unit 610 inputs the RGB image and the distance image being generated by the sensor unit 510, and estimates a center position and a pose of the image-captured target object, based on the RGB image and the distance image. The processing unit 610 includes a point cloud acquisition unit 601, a segmentation unit 602, a three-dimensional integration unit 603, a separation unit 604, an object identification unit 605, and a position and pose derivation unit 606.

Note that the point cloud acquisition unit 601, the separation unit 604, and the position and pose derivation unit 606 are basically similar to the point cloud acquisition unit 201, the separation unit 202, and the position and pose derivation unit 204 according to the second example embodiment, respectively. Further, the object identification unit 605 is associated with the object identification unit 203 according to the second example embodiment. Description of a configuration of the point cloud acquisition unit 601, the separation unit 604, the object identification unit 605, and the position and pose derivation unit 606 similar to that in the second example embodiment will be appropriately omitted and described.

The point cloud acquisition unit 601 inputs the distance image being output from the sensor unit 510. The point cloud acquisition unit 601 converts the distance image from the camera coordinate system into the world coordinate system, and generates a three-dimensional point cloud in which each point indicates a position on the three-dimensional space. The point cloud acquisition unit 601 outputs the generated three-dimensional point cloud to the three-dimensional integration unit 603. In other words, the point cloud acquisition unit 601 outputs, to the three-dimensional integration unit 603, data representing a set of three-dimensional coordinates indicating a position on the three-dimensional space of each point included in the distance image.

The segmentation unit 602 inputs an RGB image being a color image, and segments the RGB image, based on color information about each pixel included in the RGB image. The segmentation unit 602 inputs the RGB image that is output from the sensor unit 510 and is a two-dimensional image. The segmentation unit 602 segments, from the RGB image, a region having a characteristic color shade from a positional relationship between a distribution of an RGB value (an R value, a G value, and a B value) and a pixel. The segmentation unit 602 performs segmentation by using a method such as machine learning, outline extraction, super pixel, k-means, and x-means.

Specifically, the segmentation unit 602 generates, based on an RGB value (an R value, a G value, and a B value) of each pixel of the RGB image, a histogram indicating a distribution of the RGB value by using the three-dimensional coordinate system formed of an axis indicating the R value, an axis indicating the G value, and an axis indicating the B value. The segmentation unit 602 specifies a distribution of at least one characteristic RGB value from the histogram of the RGB value. For example, when red, yellow, and blue are characteristic colors in the RGB image, the segmentation unit 602 finds a set of color shades of characteristic RGB from the distribution of the RGB. The segmentation unit 602 specifies each RGB value of at least one characteristic RGB value.

When the segmentation unit 602 specifies a characteristic RGB value (color shade of RGB), the segmentation unit 602 compares an RGB value of each pixel of the RGB image with the specified RGB value, couples a pixel similar to the specified RGB value, and calculates a coupling pixel region having the specified RGB value. The segmentation unit 602 associates the specified RGB value with each pixel included in the coupling pixel region.

When an RGB value of an adjacent pixel being adjacent to a first pixel included in the coupling pixel region is not similar to the specified RGB value, the segmentation unit 602 determines whether a distance between a second pixel different from the first pixel included in the coupling pixel region and the adjacent pixel falls within a predetermined value. When the distance described above falls within the predetermined value, the segmentation unit 602 replaces the RGB value of the adjacent pixel with an RGB value associated with the first pixel and the second pixel. For example, even when a plurality of colors are included in a certain target object, the segmentation unit 602 can specify an object region of a target object by using a characteristic color among the plurality of colors by replacing the adjacent pixel with the RGB value associated with the first pixel and the second pixel. For example, it is assumed that a white dot is included in a red region. When a white pixel is a pixel close to a coupling pixel region of red, the segmentation unit 602 determines a distance between the adjacent pixel and a pixel in the coupling pixel region in order to replace the white pixel with red. Then, when the distance falls within a predetermined value, the segmentation unit 602 replaces an RGB value of the adjacent pixel with an RGB value in the coupling pixel region.

The segmentation unit 602 outputs, to the three-dimensional integration unit 603, an RGB image acquired by segmenting the input RGB image. In other words, the segmentation unit 602 outputs, to the three-dimensional integration unit 603, an RGB image in which a characteristic RGB value is associated with each pixel in the segmented region. Note that, when an RGB image is not acquired as in a case where the sensor unit 510 cannot acquire an RGB image, the segmentation unit 602 does not perform the processing.

The three-dimensional integration unit 603 generates the three-dimensional point cloud to which the color information is added, based on the distance image and the color information about the segmented region. Specifically, the three-dimensional integration unit 603 inputs the three-dimensional point cloud from the point cloud acquisition unit 601, and inputs the segmented RGB image from the segmentation unit 602. The three-dimensional integration unit 603 integrates three-dimensional coordinates of each point included in the three-dimensional point cloud and the segmented RGB image. The three-dimensional integration unit 603 specifies a pixel in the RGB image being associated with the three-dimensional coordinates of each point included in the three-dimensional point cloud, labels the three-dimensional coordinates of each point included in the three-dimensional point cloud with the RGB value of the specified pixel, and generates an RGB-depth (D) point cloud. The RGB-D point cloud is information in which the three-dimensional coordinates are labeled with the RGB value. In this way, the three-dimensional integration unit 603 generates the RGB-D point cloud being the three-dimensional point cloud in which the color information about the segmented region is added to each generated three-dimensional point cloud. The three-dimensional integration unit 603 outputs the generated RGB-D point cloud to the separation unit 604.

Note that, when the sensor unit 510 does not acquire the RGB image, three-dimensional integration unit 603 may generate the RGB-D point cloud in which the three-dimensional point cloud acquired from the point cloud acquisition unit 601 is labeled with an RGB value representing that the RGB image is not acquired. The RGB value representing that the RGB image is not acquired is, for example, an RGB value associated with a background color of a worktable being already known by the three-dimensional object recognition device 500, may be an RGB value in which an R value, a G value, and a B value are all 255, and may be an RGB value in which an R value, a G value, and a B value are all 0.

The separation unit 604 inputs the RGB-D point cloud from the three-dimensional integration unit 603. Similarly to the second example embodiment, the separation unit 604 removes an unnecessary RGB-D point cloud being the three-dimensional point cloud labeled with the RGB value, which is different from the second example embodiment. The separation unit 604 outputs the RGB-D point cloud after the unnecessary RGB-D point cloud is removed to the object identification unit 605.

The object identification unit 605 inputs the RGB-D point cloud from the separation unit 604. The object identification unit 605 specifies an object region including an image-captured target object, based on the RGB value being the color information added to the RGB-D point cloud generated by the three-dimensional integration unit 603, and a distance between the RGB-D point clouds. Further, similarly to the second example embodiment, the object identification unit 605 specifies a reference shape similar to each image-captured target object, based on the RGB-D point cloud included in the object region and feature information about the reference shape being a primitive shape.

Figure 11:
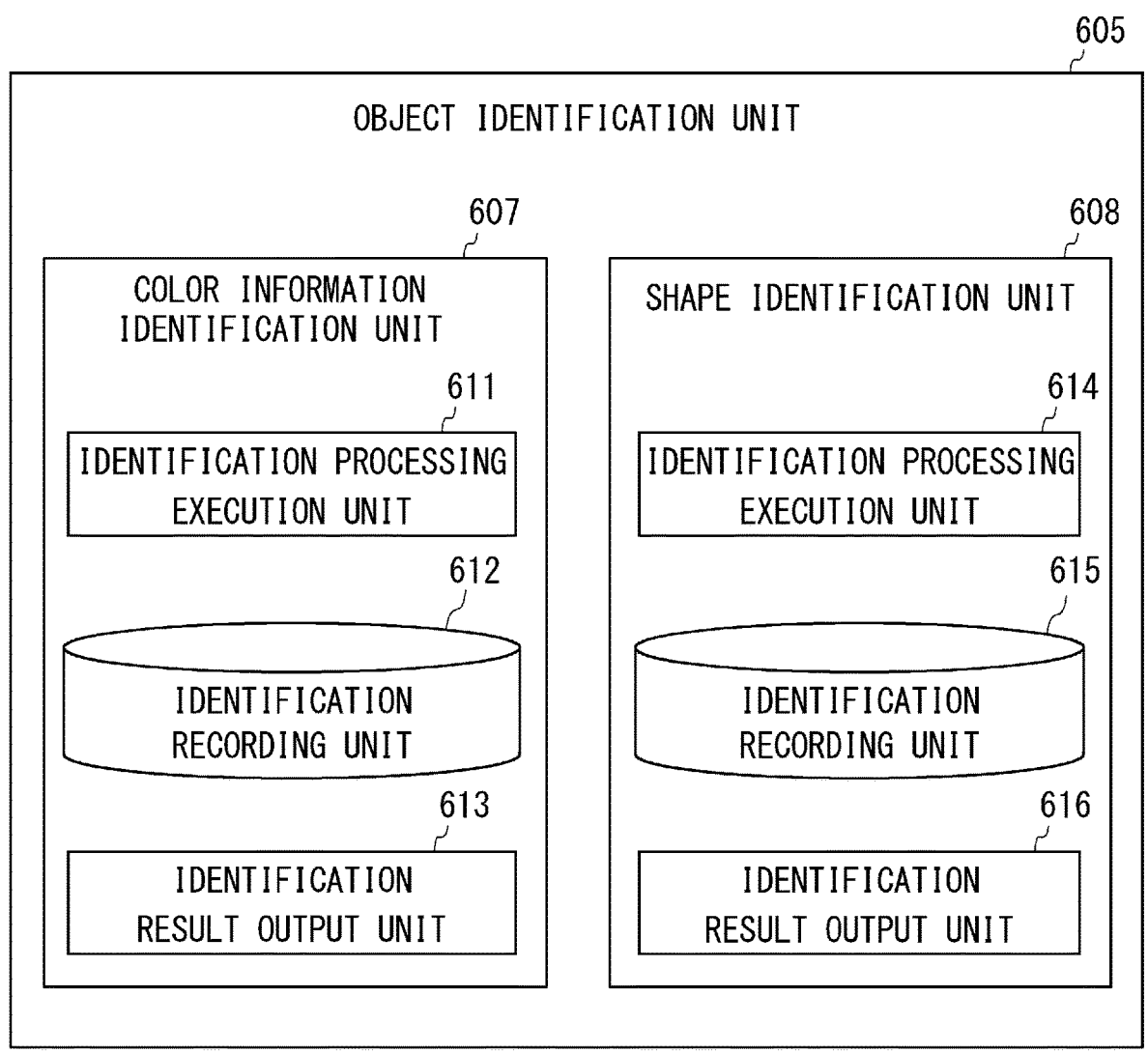
FIG. 11 is a diagram illustrating a detailed configuration example of an object identification unit according to the third example embodiment.

Herein, details of the object identification unit 605 will be described with reference to FIG. 11. FIG. 11 is a diagram illustrating a detailed configuration example of the object identification unit according to the third example embodiment. As illustrated in FIG. 11, the object identification unit 605 includes a color information identification unit 607 and a shape identification unit 608.

The color information identification unit 607 inputs the RGB-D point cloud from the separation unit 604, and specifies a color region having the same RGB value, based on the RGB value labeling the three-dimensional coordinates of each point included in the input RGB-D point cloud. The color information identification unit 607 includes an identification processing execution unit 611, an identification recording unit 612, and an identification result output unit 613.

The identification processing execution unit 611 is an execution unit that identifies color information, and may thus be referred to as a color information identification processing execution unit. The identification processing execution unit 611 inputs the RGB-D point cloud from the separation unit 604. The identification processing execution unit 611 excludes an RGB value representing that an RGB image is not acquired from the RGB value labeling each point included in the RGB-D point cloud. The identification processing execution unit 611 specifies a color region, based on the RGB value of the RGB-D point cloud from which the RGB value representing that the RGB image is not acquired is excluded.

For example, it is assumed that a color associated with an RGB value labeling an RGB-D point cloud is red, green, and blue. In this case, the identification processing execution unit 611 specifies, as each color region, the RGB-D point cloud labeled with the RGB value of red, the RGB-D point cloud labeled with the RGB value of green, and the RGB-D point cloud labeled with the RGB value of blue.

The identification processing execution unit 611 assigns a color ID to a color region having the same RGB value. The identification processing execution unit 611 records the color ID, the RGB value, and the RGB-D point cloud included in the color region assigned with the color ID in association with one another in the identification recording unit 612.

The identification recording unit 612 stores the color ID, the RGB value, and the RGB-D point cloud in the color region assigned with the color ID in association with one another in response to the control of the identification processing execution unit 611.

The identification result output unit 613 outputs the color ID, the RGB value, and the RGB-D point cloud in the color region assigned with the color ID to the shape identification unit 608.

The shape identification unit 608 specifies, for each color region specified by the color information identification unit 607, an object region including an RGB-D point cloud indicating a position of a surface of a target object, based on a distance between the RGB-D point clouds of the RGB-D point clouds included in the color region. Note that, when the color ID is not assigned to all the RGB-D point clouds, the shape identification unit 608 determines that an RGB image is not acquired, and performs processing similar to that of the object identification unit 203 according to the second example embodiment without considering color information.

For example, it is assumed that the identification processing execution unit 611 specifies, as each color region, the RGB-D point cloud labeled with the RGB value of red, the RGB-D point cloud labeled with the RGB value of green, and the RGB-D point cloud labeled with the RGB value of blue. In this case, the shape identification unit 608 specifies an object region including each target object included in the RGB-D point cloud labeled with the RGB value of red. Similarly, the shape identification unit 608 specifies an object region including each target object included in the RGB-D point cloud labeled with the RGB value of green, and specifies an object region including each target object included in the RGB-D point cloud labeled with the RGB value of blue.

The shape identification unit 608 specifies, for each target object included in the specified object region, a reference shape similar to the target object by using feature information about the reference shape.

The shape identification unit 608 includes an identification processing execution unit 614, an identification recording unit 615, and an identification result output unit 616. The identification processing execution unit 614, the identification recording unit 615, and the identification result output unit 616 are associated with the identification processing execution unit 205, the identification recording unit 206, and the identification result output unit 207 according to the second example embodiment, respectively.

The identification processing execution unit 614 specifies the object region by using the RGB-D point cloud, and specifies a reference shape similar to the target object included in the object region. The identification processing execution unit 614 is an execution unit that specifies a reference shape, and may thus be referred to as a reference shape identification processing execution unit. The identification processing execution unit 614 inputs, for each color ID, the color ID, the RGB value, and the RGB-D point cloud in the color region assigned with the color ID from the identification result output unit 613. The identification processing execution unit 614 specifies, for each color ID, the object region, based on a distance between the RGB-D point clouds by using three-dimensional coordinates included in the RGB-D point cloud assigned with the color ID. Similarly to the second example embodiment, the identification processing execution unit 614 specifies the object region by extracting a point having a distance to an adjacent point within a predetermined value from the input RGB-D point cloud. Note that the identification processing execution unit 614 may input, from the identification result output unit 613, the RGB-D point cloud from which the RGB value representing that the RGB image is not acquired is excluded. Then, the identification processing execution unit 614 may determine the object region by deciding an anchor point and searching for a vicinity point having the same color ID or the same RGB value as that of the anchor point.

When the identification processing execution unit 614 specifies the object region for each color ID, the identification processing execution unit 614 specifies a reference shape similar to the target object included in each object region. Similarly to the second example embodiment, the identification processing execution unit 614 specifies a reference shape similar to each target object, based on generated normal vectors and normal vector related information included in feature information about the reference shape.

When the identification processing execution unit 614 specifies the reference shape for the target object included in each object region, the identification processing execution unit 614 assigns a shape ID associated with the specified reference shape. The identification processing execution unit 614 assigns a different kind ID for each combination of the color ID and the shape ID in such a way that the combination of the color ID and the shape ID is unique. The identification processing execution unit 614 assign an individual ID in such a way that each target object having the same kind ID is unique. The identification processing execution unit 614 records, for each target object included in the object region, the kind ID, the individual ID, the color ID, the shape ID, the RGB value, and the RGB-D point cloud included in the object region in association with one another in the identification recording unit 615.

The identification recording unit 615 stores, for each target object included in each object region, the kind ID, the individual ID, the color ID, the shape ID, the RGB value, and the RGB-D point cloud included in the object region in association with one another in response to the control of the identification processing execution unit 614.

The identification result output unit 616 outputs the kind ID, the individual ID, the color ID, the shape ID, the RGB value, and the RGB-D point cloud included in the object region to the position and pose derivation unit 606.

Returning to FIG. 10, the position and pose derivation unit 606 will be described.

The position and pose derivation unit 606 inputs information about the target object included in each object region. The position and pose derivation unit 204 inputs the kind ID, the individual ID, the color ID, the shape ID, the RGB value, and the RGB-D point cloud included in the object region.

The position and pose derivation unit 606 calculates, for each target object specified by a combination of the kind ID and the individual ID, a center point of the input three-dimensional point cloud of the object region. The position and pose derivation unit 606 estimates the calculated center point as a center position of the target object. The position and pose derivation unit 606 records, for the target object having the center position estimated, coordinates of the center position in association with the kind ID and the individual ID in the identification recording unit 615.

Similarly to the second example embodiment, the position and pose derivation unit 606 approximates the target object included in the object region by the reference shape specified by the object identification unit 605, and estimates an axis from the approximated reference shape. The position and pose derivation unit 606 estimates a pose of the target object, based on the estimated axis and a reference axis of the reference shape specified by the object identification unit 605. The position and pose derivation unit 606 calculates an angle difference between the estimated axis and the reference axis, and estimates a pose of the target object by acquiring a roll angle, a pitch angle, and a yaw angle, based on the calculated angle difference. The position and pose derivation unit 606 records, for the target object having the pose estimated, the pose in association with the kind ID and the individual ID in the identification recording unit 615.

<Operation Example of Three-Dimensional Object Recognition Device>

Figure 12:
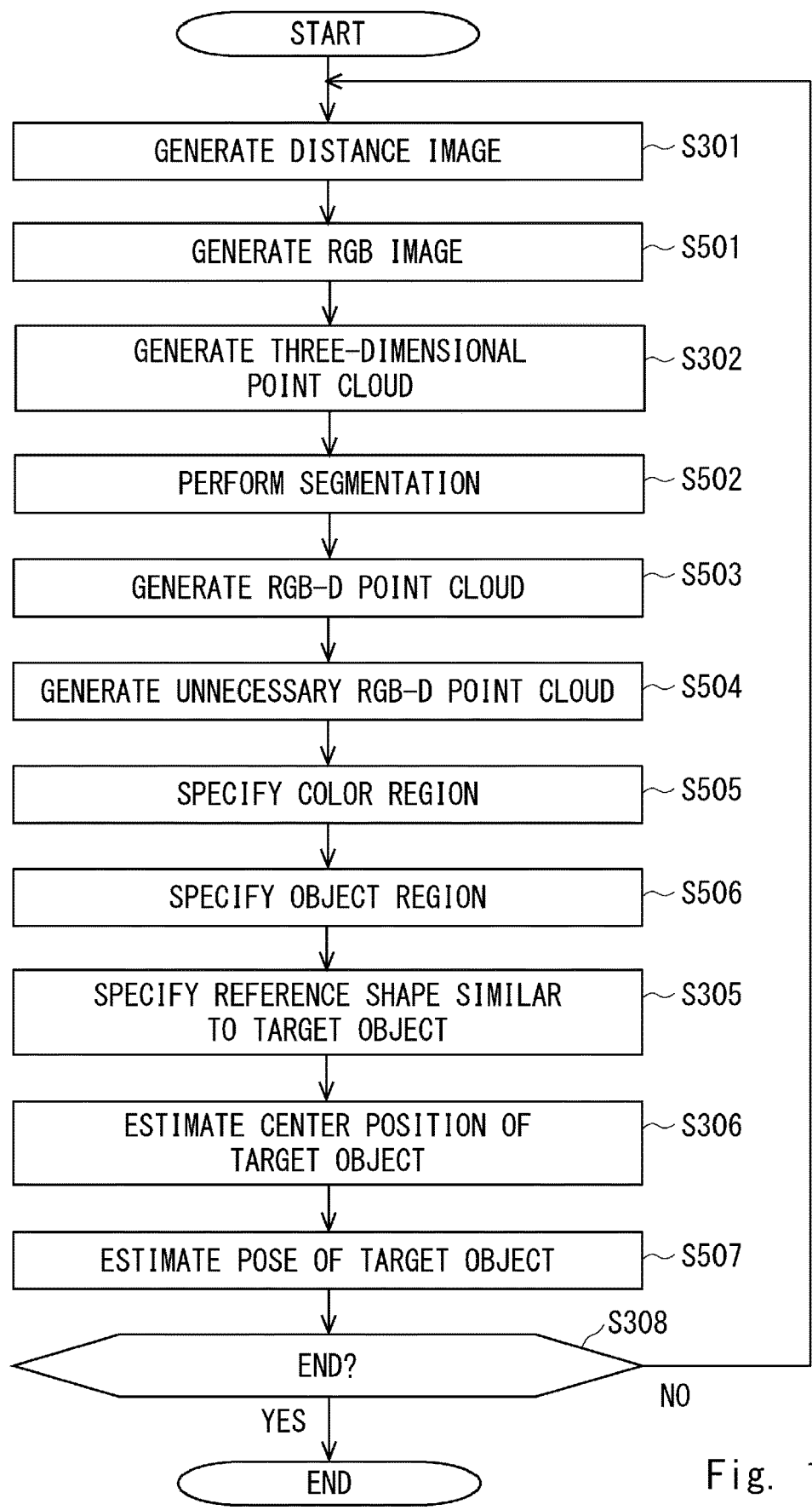
FIG. 12 is a diagram illustrating an operation example of the three-dimensional object recognition device according to the third example embodiment.

Next, an operation example of the three-dimensional object recognition device 500 according to the third example embodiment will be described with reference to FIG. 12. FIG. 12 is a diagram illustrating the operation example of the three-dimensional object recognition device according to the third example embodiment.

FIG. 12 is a flowchart associated with the operation example of the three-dimensional object recognition device 100 according to the second example embodiment illustrated in FIG. 4. In FIG. 12, an operation similar to that in FIG. 4 is provided with the same reference sign, and description of the operation similar to that in FIG. 4 will be appropriately omitted. Further, in FIG. 12, steps S504 and S506 are operations acquired by respectively replacing steps S303 and S304 in FIG. 4. Thus, description of steps S504 to S506 similar to the operation in FIG. 4 will also be appropriately omitted. Note that, when the sensor unit 510 does not acquire an RGB image, the three-dimensional object recognition device 500 basically has an operation similar to that in the second example embodiment. Thus, description of the operation when the sensor unit 510 does not acquire an RGB image will be omitted.

The sensor unit 510 captures an image of a predetermined region of a worktable and the like, and generates a distance image including distance information about each point from the sensor unit 510 to a target object (step S301).

The sensor unit 510 captures an image of a predetermined region of the worktable and the like, and generates an RGB image (step S501). Note that step S501 may be performed after step S301, and may be performed simultaneously with step S301.

The point cloud acquisition unit 601 converts the distance image from the camera coordinate system into the world coordinate system, and generates a three-dimensional point cloud in which each point indicates a position on the three-dimensional space (step S302).

The segmentation unit 602 inputs the RGB image being a color image, and segments the RGB image, based on color information about each pixel included in the RGB image (step S502). Note that step S502 may be performed after step S302, and may be performed simultaneously with step S302.

The three-dimensional integration unit 603 integrates three-dimensional coordinates of each point included in the three-dimensional point cloud and the segmented RGB image, labels the three-dimensional coordinates of each point included in the three-dimensional point cloud with an RGB value of a specified pixel, and generates an RGB-D point cloud (step S503).

The three-dimensional integration unit 603 inputs the three-dimensional point cloud from the point cloud acquisition unit 601, and inputs the segmented RGB image from the segmentation unit 602. The three-dimensional integration unit 603 integrates the three-dimensional coordinates of each point included in the three-dimensional point cloud and the segmented RGB image. The three-dimensional integration unit 603 specifies a pixel in the RGB image being associated with the three-dimensional coordinates of each point included in the three-dimensional point cloud, labels the three-dimensional coordinates of each point included in the three-dimensional point cloud with the RGB value of the specified pixel, and generates the RGB-D point cloud.

The separation unit 604 inputs the RGB-D point cloud from the three-dimensional integration unit 603, and removes, similarly to the second example embodiment, an unnecessary RGB-D point cloud being the three-dimensional point cloud labeled with the RGB value (step S504).

The color information identification unit 607 inputs the RGB-D point cloud from the separation unit 604, and specifies a color region having the same RGB value, based on the RGB value labeling the three-dimensional coordinates of each point included in the input RGB-D point cloud (step S505).

The shape identification unit 608 specifies, for each color region specified by the color information identification unit 607, an object region including an RGB-D point cloud indicating a position of a surface of the target object, based on a distance between the RGB-D point clouds of the RGB-D point clouds included in the color region (step S506).

The identification processing execution unit 614 inputs, for each color ID, the color ID, the RGB value, and the RGB-D point cloud in the color region assigned with the color ID from the identification result output unit 613. The identification processing execution unit 614 specifies, for each color ID, the object region, based on a distance between the RGB-D point clouds by using three-dimensional coordinates included in the RGB-D point cloud assigned with the color ID. Note that the identification processing execution unit 614 uses the RGB-D point cloud unlike the second example embodiment, but a method for specifying an object region is similar to that in the second example embodiment.

The shape identification unit 608 specifies, for each target object included in the specified object region, a reference shape similar to the target object by using feature information about the reference shape (step S305).

When the identification processing execution unit 614 specifies the object region for each color ID, the identification processing execution unit 614 specifies the reference shape similar to the target object included in each object region.

The position and pose derivation unit 606 estimates a center position of the target object included in the object region, based on the RGB-D point cloud included in the object region (step S306).

The position and pose derivation unit 606 estimates a pose of the target object included in the object region, based on the RGB-D point cloud included in the object region and the reference shape similar to the target object included in the object region (step S507).

The three-dimensional object recognition device 500 determines whether a user ends the processing (step S308).

When there is no command for the end from the user (NO in step S308), the three-dimensional object recognition device 500 performs the processing after step S301 again.

On the other hand, when the command for the end from the user is received (YES in step S308), the three-dimensional object recognition device 500 ends the processing.

As described above, the three-dimensional object recognition device 500 specifies, by also using color information about an RGB image, an object region including an RGB-D point cloud indicating a position of a surface of a target object. Thus, the three-dimensional object recognition device 500 can more accurately specify an object region than the three-dimensional object recognition device 100 according to the second example embodiment. Therefore, the three-dimensional object recognition device 500 according to the third example embodiment can more accurately estimate a center position and a pose of an image-captured target object than the three-dimensional object recognition device 100 according to the second example embodiment.

Fourth Example Embodiment

Next, a fourth example embodiment will be described. The fourth example embodiment is an example embodiment in which a three-dimensional object recognition system including the three-dimensional object recognition device according to the second example embodiment or the third example embodiment will be described. Note that the present example embodiment will be described by using the third example embodiment, but the second example embodiment may be applied.

<Configuration Example of Three-Dimensional Object Recognition System>

Figure 13:
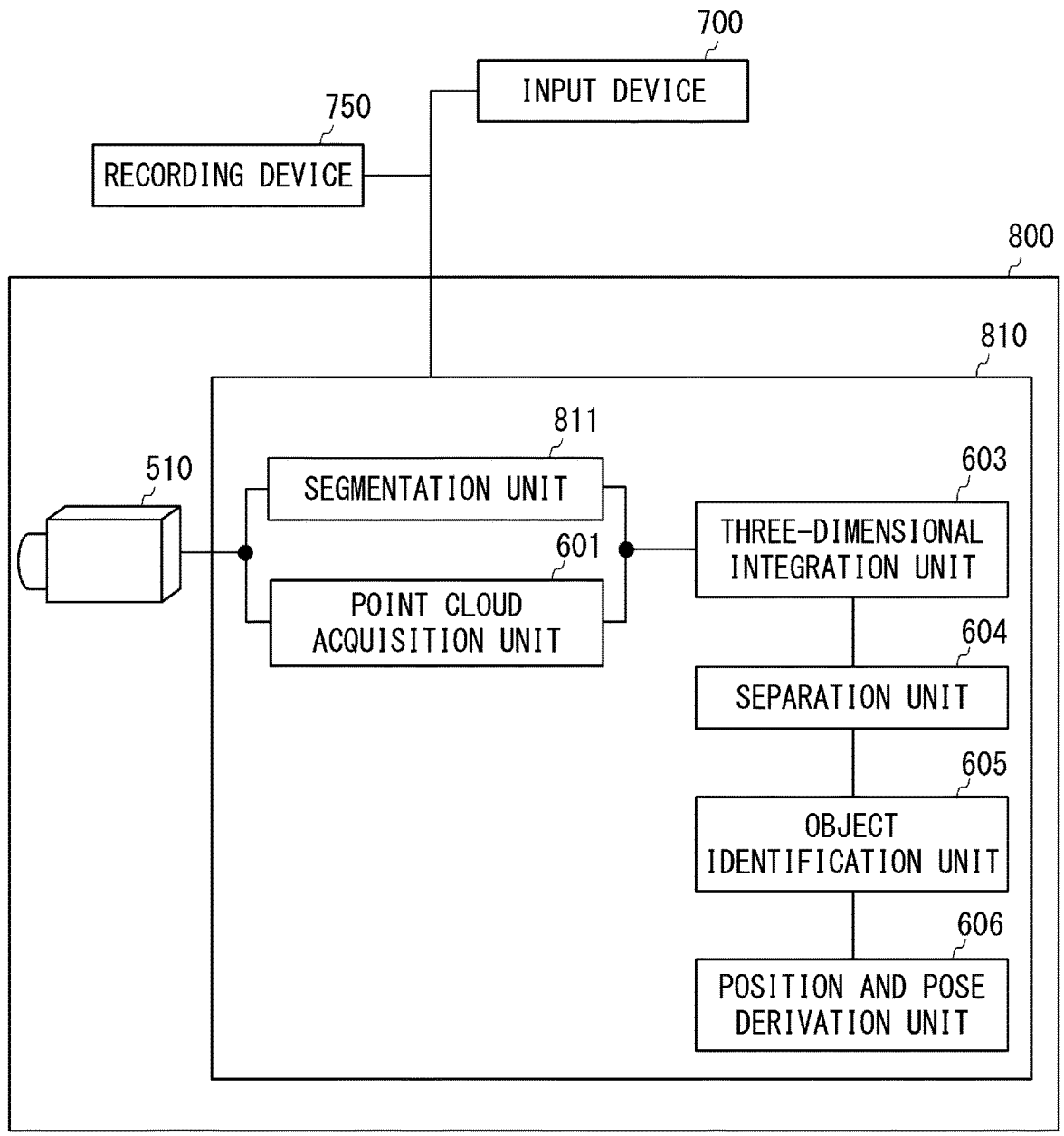
FIG. 13 is a diagram illustrating a configuration example of a three-dimensional object recognition system according to a fourth example embodiment.

A configuration example of a three-dimensional object recognition system 1000 according to the fourth example embodiment will be described with reference to FIG. 13. FIG. 13 is a diagram illustrating the configuration example of the three-dimensional object recognition system according to the fourth example embodiment. The three-dimensional object recognition system 1000 includes an input device 700, a recording device 750, and a three-dimensional object recognition device 800.

The input device 700 is, for example, a personal computer device, a server computer, and the like. The input device 700 is, for example, an input device including a mouse, a keyboard, a display, a touch panel, and the like. The input device 700 includes an interface that inputs detection target color information that is desired by a user to be recognized and indicates color information about a detection target. The input device 700 receives an input of the detection target color information from a user, and outputs the input detection target color information to a processing unit 810 of the three-dimensional object recognition device 800 and the recording device 750.

The input device 700 may receive an input of an R value, a G value, and a B value from a user, and input the input RGB value as the detection target color information. Alternatively, the input device 700 may receive an input of a selected color of colors displayed on a display from a user, and input an RGB value associated with the selected color as the detection target color information.

The recording device 750 is a device that records the detection target color information being input from a user. The recording device 750 inputs information acquired from the input device 700. Further, the recording device 750 also records the detection target color information being input from the past. The recording device 750 can shorten an input of color information desired by a user to be recognized by storing the detection target color information registered by the user in the past. When detection target color information different from the detection target color information being input from the input device 700 is recorded, the recording device 750 may output the detection target color information to the processing unit 810. In other words, the recording device 750 may be configured to input, to the processing unit 810, not only the detection target color information being input to the input device 700 by a user but also the detection target color information being registered in the past by the user.

The three-dimensional object recognition device 800 is associated with the three-dimensional object recognition device 500 according to the third example embodiment. The three-dimensional object recognition device 800 estimates a center position and a pose of an image-captured target object, based on a distance image and an RGB image being generated by a sensor unit 510. The three-dimensional object recognition device 800 inputs detection target color information from the input device 700 and the recording device 750, and estimates a center position and a pose of a target object including the input detection target color information among image-captured target objects.

<Configuration Example of Three-Dimensional Object Recognition Device>

Next, a configuration example of the three-dimensional object recognition device 800 will be described. The three-dimensional object recognition device 800 basically has a configuration similar to the three-dimensional object recognition device 500 according to the third example embodiment. The three-dimensional object recognition device 800 includes the sensor unit 510 and the processing unit 810. The sensor unit 510 is similar to that in the third example embodiment, and thus description will be omitted.

The processing unit 810 includes a point cloud acquisition unit 601, a segmentation unit 811, a three-dimensional integration unit 603, a separation unit 604, an object identification unit 605, and a position and pose derivation unit 606. As compared with the processing unit 610 according to the third example embodiment, in the processing unit 810, the segmentation unit 602 according to the third example embodiment is replaced with the segmentation unit 811. The point cloud acquisition unit 601, the three-dimensional integration unit 603, the separation unit 604, the object identification unit 605, and the position and pose derivation unit 606 are basically similar to those in the third example embodiment, and thus description overlapping the third example embodiment will be appropriately omitted.

The segmentation unit 811 inputs an RGB image from the sensor unit 510, and inputs detection target color information from the input device 700 and the recording device 750. Similarly to the third example embodiment, the segmentation unit 811 inputs the RGB image being a color image, and segments the RGB image, based on color information about each pixel included in the RGB image. The segmentation unit 811 generates the RGB image in which a characteristic RGB value is associated with each pixel in a segmented region.

The segmentation unit 811 compares the RGB value of each pixel in the segmented region with an RGB value included in the detection target color information, and extracts a region including the detection target color information from the segmented region. The segmentation unit 811 replaces the RGB value in a region other than the extracted region with an RGB value representing that an RGB image is not acquired. In other words, the segmentation unit 811 generates the RGB image including only the region including the detection target color information. The segmentation unit 811 outputs, to the three-dimensional integration unit 603, the RGB image including only the region including the detection target color information.

The three-dimensional integration unit 603 inputs a three-dimensional point cloud from the point cloud acquisition unit 601, and inputs the segmented RGB image from the segmentation unit 811. The three-dimensional integration unit 603 integrates three-dimensional coordinates of each point included in the three-dimensional point cloud and the segmented RGB image. The three-dimensional integration unit 603 specifies a pixel in the RGB image being associated with the three-dimensional coordinates of each point included in the three-dimensional point cloud, labels the three-dimensional coordinates of each point included in the three-dimensional point cloud with the RGB value of the specified pixel, and generates the RGB-D point cloud. The segmented RGB image includes only the region to which the detection target color information is added. Thus, the three-dimensional integration unit 603 generates the RGB-D point cloud being the three-dimensional point cloud to which the detection target color information is added. Note that the three-dimensional integration unit 603 may generate the RGB-D point cloud in which the RGB value of the region without the detection target color information being added in the segmented RGB image is the RGB value representing that the RGB image is not acquired. The three-dimensional integration unit 603 outputs the generated RGB-D point cloud to the separation unit 604.

The object identification unit 605 inputs the RGB-D point cloud from the separation unit 604. The object identification unit 605 specifies a color region, based on the RGB value labeling each point included in the input RGB-D point cloud. Note that, when the RGB value of the region without the detection target color information being added is the RGB value representing that the RGB image is not acquired, the object identification unit 605 excludes the RGB-D point cloud of the RGB value representing that the RGB image is not acquired among the RGB-D point clouds. The object identification unit 605 specifies the color region, based on the RGB value of the RGB-D point cloud after the RGB value representing that the RGB image is not acquired is excluded.

The object identification unit 605 specifies an object region including an image-captured target object, based on the RGB value being the color information added to the RGB-D point cloud generated by the three-dimensional integration unit 603, and a distance between the RGB-D point clouds. In other words, the object identification unit 605 specifies, from the RGB-D point cloud including the detection target color information, an object region including the RGB-D point cloud including color information desired by a user to be detected and indicating a position of a surface of a target object. Further, the object identification unit 605 specifies a reference shape similar to each image-captured target object, based on the RGB-D point cloud included in the object region and feature information about the reference shape being a primitive shape.

Similarly to the third example embodiment, the position and pose derivation unit 606 estimates a center position and a pose of the target object included in the object region, based on a three-dimensional point cloud included in the object region and a reference shape similar to the target object included in the object region. The object identification unit 605 specifies, from the RGB-D point cloud including the detection target color information, the object region including the RGB-D point cloud including color information desired by a user to be detected and indicating a position of a surface of the target object. Thus, the position and pose derivation unit 606 can estimate a center position and a pose of the target object including the detection target color information among the image-captured target objects.

<Operation Example of Three-Dimensional Object Recognition Device>

Figure 14:
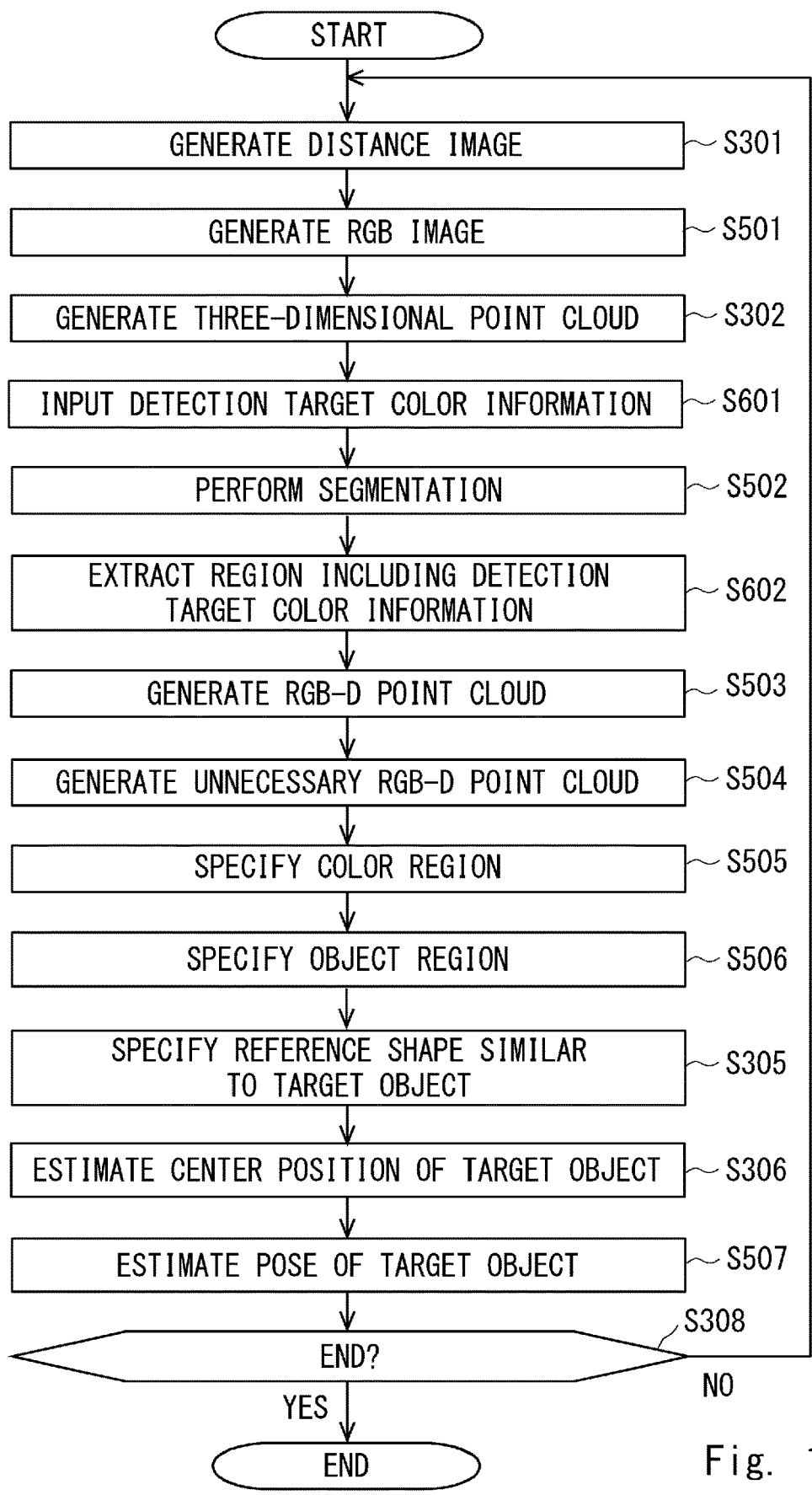
FIG. 14 is a diagram illustrating an operation example of the three-dimensional object recognition system according to the fourth example embodiment.

An operation example of the three-dimensional object recognition device 800 according to the fourth example embodiment will be described with reference to FIG. 14. FIG. 14 is a diagram illustrating the operation example of the three-dimensional object recognition device according to the fourth example embodiment.

FIG. 14 is a flowchart associated with the operation example of the three-dimensional object recognition device 500 according to the third example embodiment illustrated in FIG. 12. FIG. 14 is the flowchart acquired by adding steps S601 and S602 to the flowchart in FIG. 12. Thus, description of an operation similar to that in FIG. 12 in the flowchart in FIG. 14 will be appropriately omitted.

The sensor unit 510 captures an image of a predetermined region of a worktable and the like, and generates a distance image including distance information about each point from the sensor unit 510 to a target object (step S301).

The sensor unit 510 captures an image of a predetermined region of the worktable and the like, and generates an RGB image (step S501). Note that step S501 may be performed after step S301, and may be performed simultaneously with step S301.

The point cloud acquisition unit 601 converts the distance image from the camera coordinate system into the world coordinate system, and generates a three-dimensional point cloud in which each point indicates a position on the three-dimensional space (step S302).

The segmentation unit 811 inputs detection target color information from the input device 700 and the recording device 750 (step S601).

The segmentation unit 811 inputs the RGB image being a color image, and segments the RGB image, based on color information about each pixel included in the RGB image (step S502). Note that step S502 may be performed after step S302, and may be performed simultaneously with step S302.

The segmentation unit 811 compares the RGB value of each pixel in the segmented region with an RGB value included in the detection target color information, and extracts a region including the detection target color information from the segmented region (step S602).

The three-dimensional integration unit 603 integrates three-dimensional coordinates of each point included in the three-dimensional point cloud and the segmented RGB image, labels the three-dimensional coordinates of each point included in the three-dimensional point cloud with an RGB value of a specified pixel, and generates an RGB-D point cloud (step S503).

The separation unit 604 inputs the RGB-D point cloud from the three-dimensional integration unit 603, and removes, similarly to the second example embodiment, an unnecessary RGB-D point cloud being the three-dimensional point cloud labeled with the RGB value (step S504).

The color information identification unit 607 inputs the RGB-D point cloud from the separation unit 604, and specifies a color region having the same RGB value, based on the RGB value labeling the three-dimensional coordinates of each point included in the input RGB-D point cloud (step S505).

The shape identification unit 608 specifies, for each color region specified by the color information identification unit 607, an object region including an RGB-D point cloud indicating a position of a surface of the target object, based on a distance between the RGB-D point clouds of the RGB-D point clouds included in the color region (step S506).

The shape identification unit 608 specifies, for each target object included in the specified object region, a reference shape similar to the target object by using feature information about the reference shape (step S305).

The position and pose derivation unit 606 estimates a center position of the target object included in the object region, based on the RGB-D point cloud included in the object region (step S306).

The position and pose derivation unit 606 estimates a pose of the target object included in the object region, based on the RGB-D point cloud included in the object region and the reference shape similar to the target object included in the object region (step S507).

The three-dimensional object recognition device 800 determines whether a user ends the processing (step S308).

When there is no command for the end from the user (NO in step S308), the three-dimensional object recognition device 800 performs the processing after step S301 again.

On the other hand, when the command for the end from the user is received (YES in step S308), the three-dimensional object recognition device 800 ends the processing.

As described above, the three-dimensional object recognition device 800 can estimate a center position and a pose of a target object including detection target color information by inputting the detection target color information from the input device 700 and the recording device 750, and extracting an RGB-D point cloud including the detection target color information. Therefore, the three-dimensional object recognition device 800 according to the fourth example embodiment can select any target object desired by a user to be detected, and can thus easily and instantly estimate a center position and a pose of the target object.

Modification Example

In the example embodiments described above, it is described that the three-dimensional object recognition device 800 inputs detection target color information being input from a user, but the user may designate an image region of a detection target and the three-dimensional object recognition device 800 may specify detection color information by using the image region.

In this case, the segmentation unit 811 inputs an RGB image from the sensor unit 510, and performs segmentation on the input RGB image. The segmentation unit 811 displays the segmented RGB image on the input device 700. A user designates a detection target region in the segmented RGB image, and the input device 700 inputs the designated detection target region. The input device 700 inputs the detection target region to the segmentation unit 811.

The segmentation unit 811 specifies the detection target region in the segmented RGB image. The segmentation unit 811 specifies detection target color information by selecting an RGB value having a greatest pixel number among RGB values included in the detection target region. The segmentation unit 811 extracts a region including the detection target color information from the segmented region. Even when such a modification is applied to the fourth example embodiment, an effect similar to that in the fourth example embodiment can be acquired.

Fifth Example Embodiment

Next, a fifth example embodiment will be described. The fifth example embodiment is an example embodiment in which an object recognition system for causing a robot device to move a target object being a movement target by using the three-dimensional object recognition device according to any of the second example embodiment to the fourth example embodiment will be described. Note that the present example embodiment will be described by using the third example embodiment, but the second example embodiment or the fourth example embodiment may be applied.

<Configuration Example of Three-Dimensional Object Recognition System>

Figure 15:
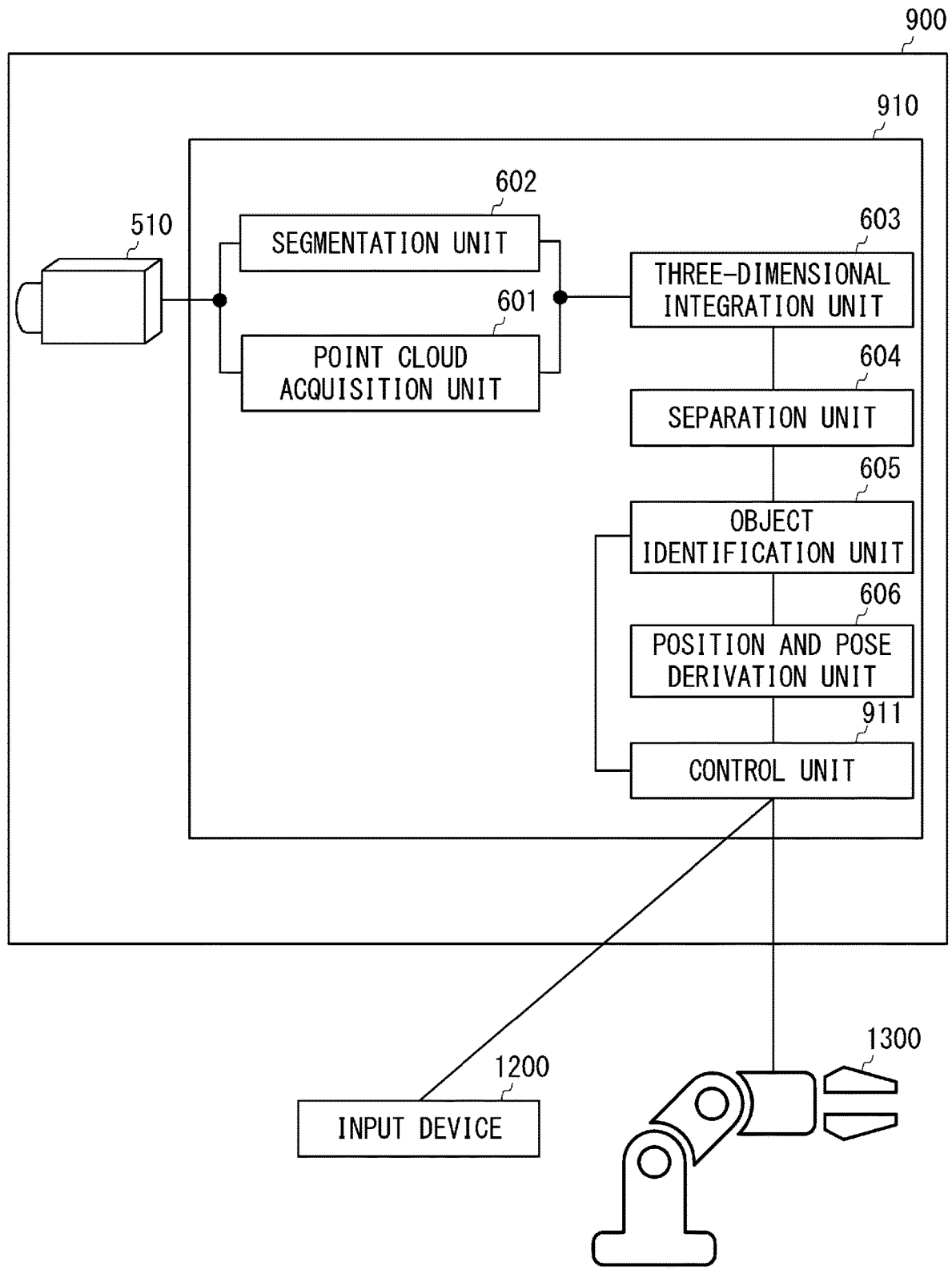
FIG. 15 is a diagram illustrating a configuration example of a three-dimensional object recognition system according to a fifth example embodiment.

A configuration example of a three-dimensional object recognition system 1100 according to the fifth example embodiment will be described with reference to FIG. 15. FIG. 15 is a diagram illustrating the configuration example of the three-dimensional object recognition system according to the fifth example embodiment. The three-dimensional object recognition system 1100 includes a three-dimensional object recognition device 900, an input device 1200, and a robot device 1300.

The three-dimensional object recognition device 900 is associated with the three-dimensional object recognition device 500 according to the third example embodiment. The three-dimensional object recognition device 900 transmits, to the input device 1200, target object information about an image-captured target object including a center position and a pose of the target object. The target object information includes a kind ID, an individual ID, a color ID, a shape ID, an RGB value, the center position, and the pose.

The three-dimensional object recognition device 900 receives, from the input device 1200, object information about an object being a movement target among the image-captured target objects and a movement destination position of the object indicated by the object information about the movement target. The object information about the movement target is information about an object to be moved by the robot device 1300 from a worktable on which the target object is placed to the movement destination position. The object information includes at least one piece of information about a reference shape similar to the object being the movement target and information about color information about the object being the movement target. Further, the object information may include the number of the objects being the movement targets. The movement destination position is a position of a storage place such as a tray after the object being the movement target is transported (moved) by the robot device 1300. The movement destination position may be designated by coordinates in the world coordinate system indicating a position of the storage place.

The three-dimensional object recognition device 900 selects the object being the movement target indicated by the object information among the image-captured target objects, based on the input object information. The three-dimensional object recognition device 900 specifies a center position and a pose of the selected object, and the movement destination position. The three-dimensional object recognition device 900 transmits, to the robot device 1300, a movement request that is a movement request for moving the selected object from the worktable to the movement destination position, and includes the specified center position, the specified pose, and the movement destination position.

The input device 1200 is, for example, a personal computer device, a server computer, and the like. The input device 1200 is, for example, an input device including a mouse, a keyboard, a display, a touch panel, and the like. The input device 1200 receives, from the three-dimensional object recognition device 900, the target object information about the image-captured target object including the center position and the pose of the target object. The input device 1200 displays the input target object information on a display, for example. The input device 1200 selectably displays a reference shape associated with a shape ID, and a color associated with an RGB value, for example.

The input device 1200 generates object information, based on at least one of a reference shape and a color being selected by a user. The input device 1200 generates the object information about the movement target including at least one of a shape ID associated with the input reference shape and a color ID associated with the input color. The input device 1200 may cause a user to input the number of objects being movement targets for each of a reference shape and a color, and include the input number of the objects being the movement targets in the object information. Further, the input device 1200 may include, in the object information, an RGB value in addition to a color ID or an RGB value instead of a color ID.

Note that the input device 1200 may display, on the display, a schematic diagram in which a user can recognize color information about a target object, a reference shape similar to the target object, and a center position and a pose of the target object, based on target object information. Then, the user may designate a region including an object being a movement target in the schematic diagram, and the input device 1200 may generate object information, based on a reference shape and a color included in the designated region. Further, the input device 1200 may store a reference shape and a color being selected by the user in the past, and generate object information, based on the reference shape and the color being selected by the user in the past.

The input device 1200 acquires, from a user, a destination position of a moving object being a movement target, based on information input from the user. The input device 1200 acquires coordinates input from the user as a movement destination position. The input device 1200 transmits the object information and the movement destination position to the three-dimensional object recognition device 900.

The robot device 1300 includes a robot hand being a grasping portion that can grasp an object being a movement target, and a robot arm that moves the object being the movement target from a worktable to a movement destination position by moving the robot hand. An installation position of the robot device 1300 is set in the world coordinate system, and the robot device 1300 is configured so as to be able to specify a position (coordinates) in the world coordinate system. The robot device 1300 receives a movement request from the three-dimensional object recognition device 900. The robot device 1300 grasps an object being a movement target according to the received movement request, moves the grasped object to a movement destination position, and places the grasped object in the movement destination position.

<Configuration Example of Three-Dimensional Object Recognition Device>

Next, a configuration example of the three-dimensional object recognition device 900 will be described. The three-dimensional object recognition device 900 includes a sensor unit 510 and a processing unit 910. The three-dimensional object recognition device 900 has a configuration in which the processing unit 610 according to the third example embodiment is replaced with the processing unit 910. The sensor unit 510 is similar to that in the third example embodiment, and thus description will be omitted.

The processing unit 910 includes a point cloud acquisition unit 601, a segmentation unit 602, a three-dimensional integration unit 603, a separation unit 604, an object identification unit 605, a position and pose derivation unit 606, and a control unit 911. The processing unit 910 has a configuration in which the control unit 911 is added to the three-dimensional object recognition device 500 according to the third example embodiment. Note that a configuration of the point cloud acquisition unit 601, the segmentation unit 602, the three-dimensional integration unit 603, the separation unit 604, the object identification unit 605, and the position and pose derivation unit 606 is similar to that in the third example embodiment, and thus description will be omitted.

The control unit 911 acquires target object information recorded in an identification recording unit 615, and transmits the target object information to the input device 1200. In the identification recording unit 615, a kind ID, an individual ID, a color ID, a shape ID, an RGB value, an RGB-D point cloud included in an associated object region, a center position, and a pose are recorded in association with each target object. The control unit 911 acquires the kind ID, the individual ID, the color ID, the shape ID, the RGB value, the center position, and the pose from the identification recording unit 615. The control unit 911 transmits the target object information including the kind ID, the individual ID, the color ID, the shape ID, the RGB value, the center position, and the pose to the input device 1200.

The control unit 911 receives, from the input device 1200, object information about a movement target among the target objects being image-captured by the sensor unit 510, and a movement destination position of the object being the movement target. In the input device 1200, the object information includes at least one of a shape ID associated with a reference shape selected by a user and a color ID associated with a color selected by the user. Further, the object information may include the number of the objects being the movement targets for each of a shape ID reference shape and color information. The movement destination position may be designated by coordinates indicating a position of a storage place that stores the object being the movement target.

The control unit 911 selects the object being the movement target, based on the input object information. When a shape ID is included in the object information, the control unit 911 acquires, from the identification recording unit 615, a center position and a pose of a target object being assigned with the same shape ID as the shape ID included in the object information. In other words, when a reference shape similar to the object being the movement target is included in the object information, the control unit 911 selects, as the object being the movement target, a target object in which the reference shape specified to be similar to each target object is a reference shape similar to the object being the movement target, among target objects.

Further, when the number of objects being movement targets is included in addition to a shape ID in the object information, the control unit 911 acquires a target object being assigned with the shape ID included in the object information. The control unit 911 selects, as the object being the movement target, a target object in the number included in the object information in an ascending order of an individual ID assigned to the acquired target object. Note that, when the number of objects being movement targets is included in addition to a shape ID in the object information, a target object in the number included in the object information may be selected randomly from target objects being assigned with the shape ID included in the object information.

When a color ID is included in the object information, the control unit 911 acquires, from the identification recording unit 615, a center position and a pose of a target object being assigned with the same color ID as the color ID included in the object information. In other words, when color information about an object being a movement target is included in the object information, the control unit 911 selects, as the object being the movement target, a target object in which color information added to an RGB-D point cloud indicating a position of a surface of each target object is the same as the color information about the object being the movement target, among target objects.

Further, when the number of objects being movement targets is included in addition to a color ID in the object information, the control unit 911 acquires a target object being assigned with the color ID included in the object information. The control unit 911 selects, as the object being the movement target, a target object in the number included in the object information in an ascending order of an individual ID assigned to the acquired target object. Note that, when the number of objects being movement targets is included in addition to a color ID in the object information, the control unit 911 may select a target object in the number included in the object information randomly from target objects being assigned with the color ID included in the object information.

The control unit 911 transmits, to the robot device 1300, a movement request including a center position and a pose of the object being the movement target, and a movement destination position. Note that the control unit 911 may store in advance, for each reference shape, a center of gravity of the reference shape and a grasping point for grasping by the robot device 1300. Then, the control unit 911 may specify a center of gravity or a grasping point of a reference shape similar to the object being the movement target, and may further include the specified center of gravity or the specified grasping point in a movement request.

<Operation Example of Three-Dimensional Object Recognition System>

Figure 16:
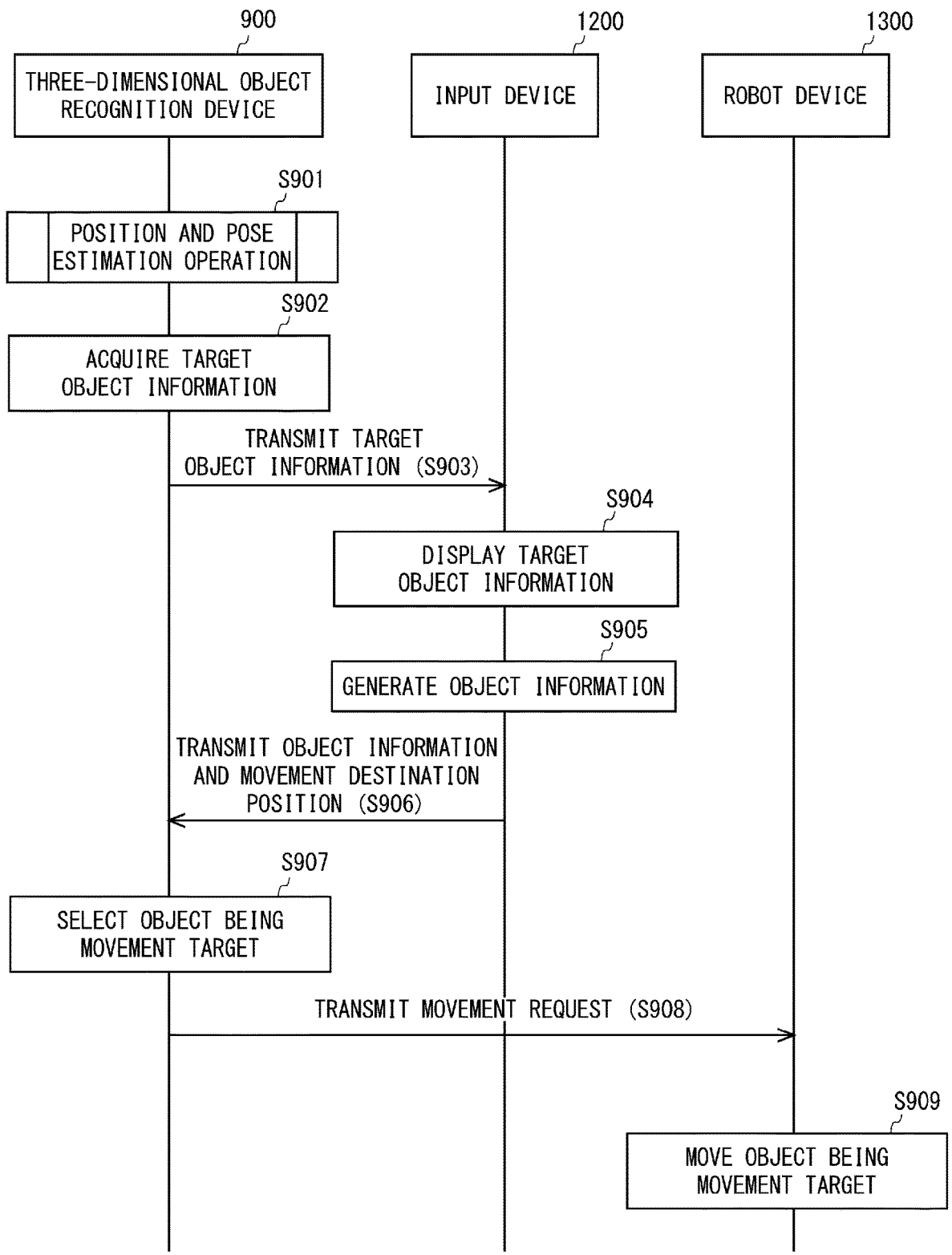
FIG. 16 is a diagram illustrating an operation example of the three-dimensional object recognition system according to the fifth example embodiment.

Next, an operation example of the three-dimensional object recognition system 1100 according to the fifth example embodiment will be described with reference to FIG. 16. FIG. 16 is a diagram illustrating the operation example of the three-dimensional object recognition system according to the fifth example embodiment.

The three-dimensional object recognition device 900 performs a position and pose estimation operation, and estimates a center position and a pose of a target object being image-captured by the sensor unit 510 (step S901). The position and pose estimation operation are an operation including steps S301 to S308 and S501 to S507 of the flowchart described with reference to FIG. 12.

The control unit 911 acquires target object information (step S902), and transmits the target object information to the input device 1200 (step S903).

The control unit 911 acquires the target object information recorded in the identification recording unit 615, and transmits the target object information to the input device 1200. Specifically, the control unit 911 acquires a kind ID, an individual ID, a color ID, a shape ID, an RGB value, a center position, and a pose from the identification recording unit 615. The control unit 911 transmits the target object information including the kind ID, the individual ID, the color ID, the shape ID, the RGB value, the center position, and the pose to the input device 1200. The input device 1200 receives the target object information from the three-dimensional object recognition device 900.

The input device 1200 displays the target object information on the display or the like (step S904), and generates object information about an object being a movement target (step S905).

The input device 1200 displays the input target object information in such a way that a reference shape associated with the shape ID and a color associated with the RGB value are selectable, for example. The input device 1200 generates the object information, based on at least one of the reference shape and the color being selected by a user. The input device 1200 generates the object information about the movement target including at least one of the shape ID associated with the input reference shape and a color ID associated with the input color. The input device 1200 may cause a user to input the number of objects being movement targets for each of the reference shape and the color, and include the input number of the objects being the movement targets in the object information.

The input device 1200 transmits the object information and the movement destination position to the three-dimensional object recognition device 900 (step S906).

The input device 1200 acquires, from a user, the movement destination position of the object being the movement target, based on information input from the user. The input device 1200 transmits the object information and the movement destination position to the three-dimensional object recognition device 900. The three-dimensional object recognition device 900 receives the object information and the movement destination position.

The control unit 911 selects the object being the movement target, based on the object information (step S907).

The control unit 911 selects the object being the movement target, based on the input object information. When a shape ID is included in the object information, the control unit 911 acquires, from the identification recording unit 615, a center position and a pose of a target object being assigned with the same shape ID as the shape ID included in the object information. When a color ID is included in the object information, the control unit 911 acquires, from the identification recording unit 615, a center position and a pose of a target object being assigned with the same color ID as the color ID included in the object information. Further, when the number of objects being movement targets is included in the object information, the control unit 911 acquires each target object being assigned with the shape ID and the color ID included in the object information. The control unit 911 selects, as the object being the movement target, a target object in the number included in the object information in an ascending order of an individual ID assigned to the acquired target object for each of the shape ID and the color ID.

The control unit 911 transmits a movement request to the robot device 1300 (step S908).

The control unit 911 transmits, to the robot device 1300, the movement request including the center position and the pose of the object being the movement target, and the movement destination position. The robot device 1300 receives the movement request.

The robot device 1300 grasps the object being the movement target according to the received movement request, and moves the grasped object to the movement destination position (step S909).

As described above, in the present example embodiment, the three-dimensional object recognition system 1100 using the three-dimensional object recognition device 900 is described. The three-dimensional object recognition device 900 is used for the three-dimensional object recognition system 1100, and thus a center position and a pose of an image-captured target object can be accurately estimated based on a distance image and an RGB image. In other words, the three-dimensional object recognition system 1100 according to the fifth example embodiment can accurately estimate a center position and a pose of a target object even when a plurality of kinds of target objects are included in image-captured target objects. Therefore, the three-dimensional object recognition system 1100 according to the fifth example embodiment can accurately estimate a center position and a pose of a target object, and can accurately move an object being a movement target to a position of a movement destination.

Other Example Embodiment

Figure 17:
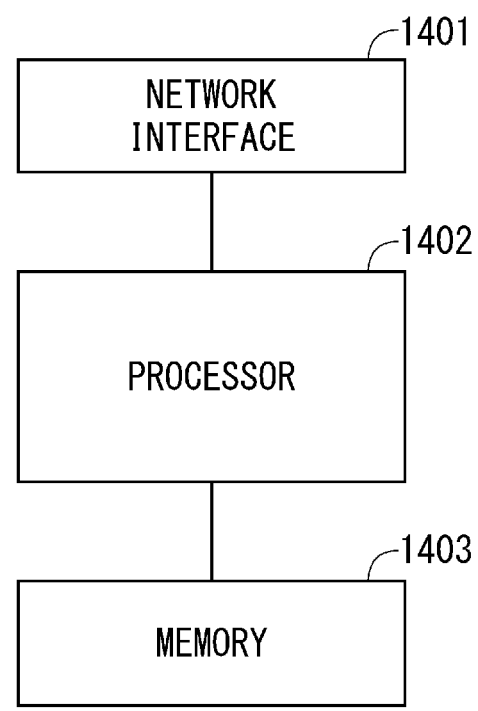
FIG. 17 is a diagram illustrating a hardware configuration example of object recognition and the like according to each of the example embodiments.

FIG. 17 is a diagram illustrating a hardware configuration example of the object recognition device 1 and the three-dimensional object recognition devices 100, 500, 800, and 900 (hereinafter referred to as the object recognition device 1 and the like) described in the example embodiments described above. With reference to FIG. 17, the object recognition device 1 and the like include a network interface 1401, a processor 1402, and a memory 1403. The network interface 1401 is used for communicating with another device, such as the input device and the robot device, included in the three-dimensional object recognition system.

The processor 1402 performs the processing of the object recognition device 1 and the like described with reference to the flowcharts in the example embodiments described above by reading software (computer program) from the memory 1403 and executing the software. The processor 1402 may be, for example, a microprocessor, a micro processing unit (MPU), or a central processing unit (CPU). The processor 1402 may include a plurality of processors.

The memory 1403 is constituted by a combination of a volatile memory and a non-volatile memory. The memory 1403 may include a storage disposed away from the processor 1402. In this case, the processor 1402 may access the memory 1403 via an input/output (I/O) interface that is not illustrated.

In the example in FIG. 17, the memory 1403 is used for storing a software module group. The processor 1402 performs the processing of the object recognition device 1 and the like described in the example embodiments described above by reading the software module group from the memory 1403 and executing the software module group.

As described with reference to FIG. 17, each processor included in the object recognition device 1 and the like executes one or a plurality of programs including a command group for causing a computer to perform an algorithm described with reference to the drawings.

In the example described above, the program may be stored by using various types of non-transitory computer-readable mediums, and may be supplied to a computer. The non-transitory computer-readable medium includes various types of tangible storage mediums. Examples of the non-transitory computer-readable medium include a magnetic recording medium (for example, a flexible disk, a magnetic tape, a hard disk drive), and a magneto-optical recording medium (for example, a magneto-optical disk). Moreover, examples of the non-transitory computer-readable medium include a CD-ROM (read only memory), a CD-R, and a CD-R/W. Moreover, examples of the non-transitory computer-readable medium include a semiconductor memory. The semiconductor memory includes, for example, a mask ROM, a programmable ROM (PROM), an erasable PROM (EPROM), a flash ROM, a random access memory (RAM). Further, the program may be supplied to the computer by various types of transitory computer-readable mediums. Examples of the transitory computer-readable medium include an electrical signal, an optical signal, and an electromagnetic wave. The transitory computer-readable medium may supply the program to the computer via a wired communication path such as an electric wire and an optical fiber or a wireless communication path.

Although the invention of the present application has been described with reference to the example embodiments, it should be understood that the invention of the present application is not limited to the above-described example embodiments. Various modifications that can be understood by those skilled in the art can be made to the configuration and the details of the invention of the present application within the scope of the invention. Further, the present disclosure may be implemented by appropriately combining the example embodiments.

A part or the whole of the example embodiments described above can be described as, but not limited to, the following supplementary notes.

(Supplementary Note 1)

An object recognition device comprising:
specification means for specifying an object region including a three-dimensional point cloud indicating a position of a surface of a target object, based on a three-dimensional point cloud generated by converting a distance image including distance information to the target object, and specifying a reference shape similar to the target object, based on a three-dimensional point cloud included in the object region and feature information about a reference shape; and
estimation means for estimating a reference position and a pose of the target object, based on a three-dimensional point cloud included in the object region and the specified reference shape.

(Supplementary Note 2)

The object recognition device according to Supplementary Note 1, wherein the specification means specifies the object region from the generated three-dimensional point cloud, based on a distance between three-dimensional point clouds.

(Supplementary Note 3)

The object recognition device according to Supplementary Note 2, wherein the specification means extracts a three-dimensional point cloud having a distance to an adjacent point within a predetermined value from the generated three-dimensional point cloud, and specifies the extracted three-dimensional point cloud as the object region.

(Supplementary Note 4)

The object recognition device according to any one of Supplementary Notes 1 to 3, wherein
the feature information includes normal vector related information being related to normal vectors of a surface constituting the reference shape, and
the specification means specifies a reference shape similar to the target object, based on normal vectors of a plurality of planes formed of a three-dimensional point cloud included in the object region, and the normal vector related information.

(Supplementary Note 5)

The object recognition device according to Supplementary Note 4, wherein
the normal vector related information includes at least one of a reference direction of normal vectors of a surface constituting the reference shape and a reference histogram distribution of normal vectors of a surface constituting the reference shape, and
the specification means specifies a reference shape similar to the target object, based on at least one of a direction and the reference direction of normal vectors of the plurality of planes, and a histogram distribution and the reference histogram distribution of normal vectors of the plurality of planes.

(Supplementary Note 6)

The object recognition device according to any one of Supplementary Notes 1 to 5, wherein
the reference position is a center position of the target object, and
the estimation means estimates, as a center position of the target object, a center position of a three-dimensional point cloud included in the object region.

(Supplementary Note 7)

The object recognition device according to any one of Supplementary Notes 1 to 6, wherein the estimation means approximates the target object to the specified reference shape, estimates an axis from the approximated reference shape, and estimates the pose, based on the estimated axis and the specified reference axis of the reference shape.

(Supplementary Note 8)

The object recognition device according to any one of Supplementary Notes 1 to 6, wherein the estimation means performs a principal component analysis on a three-dimensional point cloud included in the object region, estimates an axis constituting the target object, and estimates the pose, based on the estimated axis and the specified reference axis of the reference shape.

(Supplementary Note 9)

The object recognition device according to any one of Supplementary Notes 1 to 8, further comprising:
segmentation means for inputting a color image, and segmenting the color image, based on color information about each pixel included in the color image; and
integration means for generating a three-dimensional point cloud to which color information is added, based on the distance image and color information about the segmented region,
wherein the specification means specifies the object region by further using color information added to the generated three-dimensional point cloud.

(Supplementary Note 10)

The object recognition device according to Supplementary Note 9, wherein
the segmentation means inputs detection target color information indicating color information about a detection target, and extracts a region including the detection target color information from the segmented region, and
the integration means generates a three-dimensional point cloud to which the detection target color information is added.

(Supplementary Note 11)

The object recognition device according to Supplementary Note 9, wherein
the segmentation means inputs a detection target region of the color image, specifies detection target color information, based on the detection target region, and extracts a region including the detection target color information from the segmented region, and
the integration means generates a three-dimensional point cloud to which the detection target color information is added.

(Supplementary Note 12)

An object recognition method to be executed by an object recognition device, the object recognition method comprising:
specifying an object region including a three-dimensional point cloud indicating a position of a surface of a target object, based on a three-dimensional point cloud generated by converting a distance image including distance information to the target object;

specifying a reference shape similar to the target object, based on a three-dimensional point cloud included in the object region and feature information about a reference shape; and estimating a reference position and a pose of the target object, based on a three-dimensional point cloud included in the object region and the specified reference shape.

(Supplementary Note 13)

A non-transitory computer-readable medium storing a program causing a computer to execute processing of:

specifying an object region including a three-dimensional point cloud indicating a position of a surface of a target object, based on a three-dimensional point cloud generated by converting a distance image including distance information to the target object;

specifying a reference shape similar to the target object, based on a three-dimensional point cloud included in the object region and feature information about a reference shape; and estimating a reference position and a pose of the target object, based on a three-dimensional point cloud included in the object region and the specified reference shape.

(Supplementary Note 14)

An object recognition system comprising:

the object recognition device according to any one of Supplementary Notes 1 to 8;

an input device configured to input object information about a movement target and a destination position of a moving object indicated by object information about the movement target; and a robot device configured to move the object to the movement destination position, wherein the object recognition device further includes control means for selecting the object of the target object, based on the object information.

(Supplementary Note 15)

The object recognition system according to Supplementary Note 14, wherein the object information includes a reference shape similar to the object, and the control means selects, as the object, a target object in which the specified reference shape is a reference shape similar to the object, of the target object.

(Supplementary Note 16)

The object recognition system according to Supplementary Note 14 or 15, wherein the object information includes color information about the object, the object recognition device further includes segmentation means for inputting a color image, and segmenting the color image, based on color information about each pixel included in the color image, and integration means for generating a three-dimensional point cloud to which color information is added, based on the distance image and color information about the segmented region, the specification means specifies the object region by further using color information added to the generated three-dimensional point cloud, and the control means selects, as the object, a target object in which color information added to a three-dimensional point cloud indicating a position of a surface of the target object is the same as color information about the object, of the target object.

REFERENCE SIGNS LIST

1 OBJECT RECOGNITION DEVICE
2 SPECIFICATION UNIT
3 ESTIMATION UNIT
100, 500, 800, 900 THREE-DIMENSIONAL OBJECT RECOGNITION DEVICE
110, 510 SENSOR UNIT
201, 601 POINT CLOUD ACQUISITION UNIT
202, 604 SEPARATION UNIT
203, 605 OBJECT IDENTIFICATION UNIT
204, 606 POSITION AND POSE DERIVATION UNIT
205, 611, 614 IDENTIFICATION PROCESSING EXECUTION UNIT
206, 612, 615 IDENTIFICATION RECORDING UNIT
207, 613, 616 IDENTIFICATION RESULT OUTPUT UNIT
210, 610, 810, 910 PROCESSING UNIT
602, 811 SEGMENTATION UNIT
603 THREE-DIMENSIONAL INTEGRATION UNIT
607 COLOR INFORMATION IDENTIFICATION UNIT
608 SHAPE IDENTIFICATION UNIT
700, 1200 INPUT DEVICE
750 RECORDING DEVICE
911 CONTROL UNIT
1000, 1100 THREE-DIMENSIONAL OBJECT RECOGNITION SYSTEM
1300 ROBOT DEVICE

What is claimed is:

1. An object recognition device comprising:
at least one memory storing instructions and
at least one processor configured to execute the instructions to:
specify an object region including a three-dimensional point cloud indicating a position of a surface of a target object, based on a three-dimensional point cloud generated by converting a distance image including distance information to the target object, and specify a reference shape similar to the target object, based on a three-dimensional point cloud included in the object region and feature information about a reference shape;
estimate a reference position and a pose of the target object, based on a three-dimensional point cloud included in the object region and the specified reference shape; and
approximate the target object to the specified reference shape, estimate an axis from the approximated reference shape, and estimate the pose, based on the estimated axis and the specified reference axis of the reference shape.

2. The object recognition device according to claim 1, wherein the at least one processor is further configured to execute the instructions to:
specify the object region from the generated three-dimensional point cloud, based on a distance between three-dimensional point clouds.

3. The object recognition device according to claim 2, wherein the at least one processor is further configured to execute the instructions to:
extract a three-dimensional point cloud having a distance to an adjacent point within a predetermined value from the generated three-dimensional point cloud, and specify the extracted three-dimensional point cloud as the object region.

4. The object recognition device according to claim 1, wherein
the feature information includes normal vector related information being related to normal vectors of a surface constituting the reference shape, and
the at least one processor is further configured to execute the instructions to:
specify a reference shape similar to the target object, based on normal vectors of a plurality of planes formed of a three-dimensional point cloud included in the object region, and the normal vector related information.

5. The object recognition device according to claim 4, wherein the normal vector related information includes at least one of a reference direction of normal vectors of a surface constituting the reference shape and a reference histogram distribution of normal vectors of a surface constituting the reference shape, and
the at least one processor is further configured to execute the instructions to:
specify a reference shape similar to the target object, based on at least one of a direction and the reference direction of normal vectors of the plurality of planes, and a histogram distribution and the reference histogram distribution of normal vectors of the plurality of planes.

6. The object recognition device according to claim 1, wherein
the reference position is a center position of the target object, and
the at least one processor is further configured to execute the instructions to:
estimate, as a center position of the target object, a center position of a three-dimensional point cloud included in the object region.

7. The object recognition device according to claim 1, wherein the at least one processor is further configured to execute the instructions to:
perform a principal component analysis on a three-dimensional point cloud included in the object region, estimates an axis constituting the target object, and estimate the pose, based on the estimated axis and the specified reference axis of the reference shape.

8. The object recognition device according to claim 1, wherein the at least one processor is further configured to execute the instructions to:
input a color image, and segment the color image, based on color information about each pixel included in the color image; and
generate a three-dimensional point cloud to which color information is added, based on the distance image and color information about the segmented region,
specify the object region by further using color information added to the generated three-dimensional point cloud.

9. The object recognition device according to claim 8, wherein the at least one processor is further configured to execute the instructions to:
input detection target color information indicating color information about a detection target, and extracts a region including the detection target color information from the segmented region, and
generate a three-dimensional point cloud to which the detection target color information is added.

10. The object recognition device according to claim 8, wherein the at least one processor is further configured to execute the instructions to:
input a detection target region of the color image, specify detection target color information, based on the detection target region, and extract a region including the detection target color information from the segmented region, and
generate a three-dimensional point cloud to which the detection target color information is added.

11. An object recognition system comprising:
the object recognition device according to claim 1;
an input device configured to input object information about a movement target and a destination position of a moving object indicated by object information about the movement target; and
a robot device configured to move the object to the movement destination position,
wherein the object recognition device further selects the object of the target object, based on the object information, and
wherein
the object information includes color information about the object,
the object recognition device further
inputs a color image, and segments the color image, based on color information about each pixel included in the color image, and
generates a three-dimensional point cloud to which color information is added, based on the distance image and color information about the segmented region,
the object recognition device further specifies the object region by further using color information added to the generated three-dimensional point cloud, and
the object recognition device further selects, as the object, a target object in which color information added to a three-dimensional point cloud indicating a position of a surface of the target object is the same as color information about the object, of the target object.

12. The object recognition system according to claim 11, wherein
the object information includes a reference shape similar to the object, and
the object recognition device selects, as the object, a target object in which the specified reference shape is a reference shape similar to the object, of the target object.

13. A computer-implemented object recognition method to be executed by an object recognition device, the object recognition method comprising:
specifying an object region including a three-dimensional point cloud indicating a position of a surface of a target object, based on a three-dimensional point cloud generated by converting a distance image including distance information to the target object;
specifying a reference shape similar to the target object, based on a three-dimensional point cloud included in the object region and feature information about a reference shape;
estimating a reference position and a pose of the target object, based on a three-dimensional point cloud included in the object region and the specified reference shape; and
approximating the target object to the specified reference shape, estimating an axis from the approximated reference shape, and estimating the pose, based on the estimated axis and the specified reference axis of the reference shape.

14. A non-transitory computer-readable medium storing a program causing a computer to execute processing of:
- specifying an object region including a three-dimensional point cloud indicating a position of a surface of a target object, based on a three-dimensional point cloud generated by converting a distance image including distance information to the target object;
- specifying a reference shape similar to the target object, based on a three-dimensional point cloud included in the object region and feature information about a reference shape;
- estimating a reference position and a pose of the target object, based on a three-dimensional point cloud included in the object region and the specified reference shape; and
- approximating the target object to the specified reference shape, estimating an axis from the approximated reference shape, and estimating the pose, based on the estimated axis and the specified reference axis of the reference shape.

* * * * *